(12) United States Patent
Rayavarapu et al.

(10) Patent No.: US 11,140,565 B2
(45) Date of Patent: Oct. 5, 2021

(54) METHODS AND SYSTEMS FOR OPTIMIZING PROCESSING OF APPLICATION REQUESTS

(71) Applicant: SAMSUNG ELECTRONICS CO., LTD., Suwon-si (KR)

(72) Inventors: Ratnakar Rao Venkata Rayavarapu, Bangalore (IN); Vijay Kumar Mishra, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 16/817,057

(22) Filed: Mar. 12, 2020

(65) Prior Publication Data

US 2020/0296609 A1    Sep. 17, 2020

(30) Foreign Application Priority Data

Mar. 12, 2019    (IN) .............................. 201941009482

(51) Int. Cl.
*H04W 24/08*    (2009.01)
*H04L 29/08*    (2006.01)
(Continued)

(52) U.S. Cl.
CPC .......... *H04W 24/08* (2013.01); *H04B 17/318* (2015.01); *H04L 67/12* (2013.01);
(Continued)

(58) Field of Classification Search
CPC ..... H04W 24/08; H04W 8/245; H04W 12/06; H04W 28/0284; H04W 4/70;
(Continued)

(56) References Cited

U.S. PATENT DOCUMENTS 10,110,495 B1 * 10/2018 Sabella ............. H04M 15/8044
2017/1064037       3/2017 Das et al.
(Continued)

FOREIGN PATENT DOCUMENTS

WO    2018206844 A1    11/2018
WO    2019011408 A1    1/2019

OTHER PUBLICATIONS

International Search Report (PCT/ISA/210) dated Jun. 19, 2020 issued by the International Searching Authority in International Application No. PCT/KR2020/003434.
(Continued)

*Primary Examiner* — Brandon J Miller
(74) *Attorney, Agent, or Firm* — Sughrue Mion, PLLC

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to a method for optimizing processing of application requests.

20 Claims, 17 Drawing Sheets

(51) Int. Cl.
*H04W 8/24* (2009.01)
*H04B 17/318* (2015.01)
*H04W 12/06* (2021.01)
*H04W 28/02* (2009.01)
*G06N 20/00* (2019.01)

(52) U.S. Cl.
CPC ........... *H04W 8/245* (2013.01); *H04W 12/06* (2013.01); *H04W 28/0284* (2013.01); *G06N 20/00* (2019.01)

(58) Field of Classification Search
CPC ...... H04W 48/17; H04W 88/06; H04L 67/12; H04B 17/318; G06N 20/00
See application file for complete search history.

(56) References Cited

U.S. PATENT DOCUMENTS

| | | | |
|---|---|---|---|
| 2018/0035360 A1* | 2/2018 | Rasanen | ............... H04W 48/14 |
| 2018/0351824 A1 | 12/2018 | Giust et al. | |
| 2018/0352038 A1 | 12/2018 | Sathyanarayana et al. | |
| 2018/0352050 A1 | 12/2018 | Li et al. | |
| 2020/0169610 A1* | 5/2020 | Wang | ....................... H04W 4/60 |
| 2020/0249039 A1* | 8/2020 | Lassoued | ............... G01C 21/34 |

OTHER PUBLICATIONS

Written Opinion (PCT/ISA/237) dated Jun. 19, 2020 issued by the International Searching Authority in International Application No. PCT/KR2020/003434.

\* cited by examiner

| AppUid | On-Device Processing Time |
|---|---|
| 21253 | 13ms |
| 21263 | 1533ms |
| 21268 | 938ms |

Training data from a local processing based database

| AppUid | Signal Strenth | Nw Congestion | Edge Processing Time | Nw Type |
|---|---|---|---|---|
| 21253 | -95 | Medium/Low | 38ms | 5G |
| 21253 | -75 | Low/Medium | 28ms | 5G |
| 21263 | -100 | Medium/Low | 1158ms | 4G |
| 21263 | -72 | Low/Medium | 532ms | eNDC |
| 21268 | -95 | Medium/Low | 825ms | 4G |
| 21268 | -70 | Low/Medium | 329ms | 5G |

Training data from an edge processing based database

Regression ML model

METHODS AND SYSTEMS FOR OPTIMIZING PROCESSING OF APPLICATION REQUESTS

CROSS-REFERENCE TO RELATED APPLICATIONS

This application is based on and claims priority under 35 U.S.C. 119 to Indian Provisional Patent Application No. 201941009482, filed on Mar. 12, 2019, and to Indian Non-Provisional Patent Application No. 201941009482, filed on Nov. 19, 2019, in the Indian Patent Office, the disclosure of which is herein incorporated by reference in its entirety.

BACKGROUND

Field

The present disclosure relates to the field of multi-access edge computing (MEC) and more particularly to enable optimal utilization of a local computing and a multi-access edge computing (MEC) for processing application requests with low latency.

Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System.' The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities such as things exchange and process information without human intervention. The Internet of Everything (IoE), which is a combination of the IoT technology and the Big Data processing technology through connection with a cloud server, has emerged. As technology elements such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

An aspect of the embodiments herein is to disclose methods and systems for optimizing processing of at least one application request by utilizing multi-access edge computing (MEC) along with a User Equipment (UE) local computing.

Another aspect of the embodiments herein is to disclose methods and systems for predicting at least one processing mode for processing the at least one application request where the at least one processing mode includes at least one of a local processing, an edge processing and a hybrid processing.

Another aspect of the embodiments herein is to disclose methods and systems for using at least one machine learning (ML) method to predict an edge processing time for the at least one application request.

Another aspect of the embodiments herein is to disclose methods and systems for deriving a cost function based on at least one of a local processing time of the UE, the predicted edge processing time, battery level, and user preference.

Another aspect of the embodiments herein is to disclose methods and systems for analyzing the derived cost function and the predicted edge processing time using the ML method to decide the at least one processing mode for processing the at least one application request.

Another aspect of the embodiments herein is to disclose methods and systems for enabling the UE to download computational modules from an edge server for processing the at least one application request locally.

Another aspect of the embodiments herein is to disclose methods and systems for hosting a common computational module on the edge server that can be applicable for processing various types of application requests.

Accordingly, the embodiments herein provide methods and systems for optimizing processing of application requests. A method for optimizing processing of application requests includes receiving, by a user equipment (UE), at least one application request initiated by at least one application, identifying, by the UE, whether the received at least one application request is multi-access edge computing (MEC) enabled, deciding, by the UE, a processing mode for the received at least one application request based on the received at least one application request being MEC enabled, wherein the processing mode is decided using at least one of the MEC and local computing, and performing, by the UE, at least one action based on the processing mode decided for the received at least one application request.

The processing mode may include at least one of a local processing, an edge processing, and a hybrid processing.

The deciding of the processing mode may include determining at least one parameter by accessing a device state system for the received at least one application request, wherein the at least one parameter includes at least one of signal strength of a radio access network (RAN) supported by the UE, type of the RAN, network congestion state associated with the RAN, a unique identifier (UID) of the at least one application associated with the received at least one application request, determining at least one of local processing time and edge processing time for the received at least one application request by passing the received at least one application request and the determined at least one parameter as a key value to at least one machine learning (ML) table, deriving a cost function for the received at least one application request, and generating a processing decision parameter based on analysis of the cost function and the determined at least one of local processing time and edge processing time for the received at least one application request, and the processing decision parameter indicates the processing mode for the received at least one application request.

The method may further include building, by the UE, the at least one ML table by fetching training data from at least one of a local processing database and an edge processing database, where the training data fetched from the local processing database includes information about previously determined local processing time with respect to a plurality of application requests, and the training data fetched from the edge processing database includes information about previously determined edge processing time with respect to the plurality of application requests and at least one of the signal strength of the RAN supported by the UE, the type of the RAN, the network congestion state associated with the RAN.

The method may further include building, by the UE, the at least one ML table by receiving edge processing capabilities from at least one edge server.

The receiving of the edge processing capabilities may include at least one of: receiving the edge processing capabilities through a mean of crowd-sourced data from the at least one edge server, where the mean of crowd-sourced data is derived by the at least one edge server from a plurality of ML tables uploaded to the at least one edge server by a plurality of user equipments (UEs), and receiving the edge processing capabilities along with the mean of crowd-sourced data from the at least one edge server by performing a handshake with the at least one edge server.

The determining of at least one of the local processing time and the edge processing time for the received at least one application request may include comparing the received at least one application request and the determined at least one parameter for the received at least one application request with data of the ML table, wherein the data of the ML table includes a plurality of application requests of a plurality of applications mapped with a plurality of parameters, edge processing time, and local processing time, identifying at least one application request and corresponding at least one parameter of the ML table matching with the received at least one application request and the determined at least one parameter for the received at least one application request, and determining at least one of the local processing time and the edge processing time mapped with the identified at least application request and corresponding at least one parameter of the ML table as at least one of the local processing time and the edge processing time for the received at least one application request.

The deriving of the cost function may include assigning at least one weight to at least one of the determined local processing time for the received at least one application request, the determined edge processing time for the received at least one application request, battery level of the UE, and at least one user preference, and deriving the cost function as a function of the assigned at least one weight to at least one of the determined local processing time, the determined edge processing time, the battery level of the UE, and the at least one user preference.

The generating of the processing decision parameter may include performing an analysis on the derived cost function and the determined edge processing time for the received at least one application request, where the performing of the analysis on the derived cost function comprises performing comparisons among at least one of the determined local processing time, the determined edge processing time, battery level of the UE, and at least one user preference based on associated at least one weight, and generating the processing decision parameter based on the performed analysis.

The performing of the at least one action may include at least one of: processing the received at least one application request locally based on the decided processing mode being the local processing, offloading the received at least one application request to at least one edge server based on the decided processing mode being the edge processing, and processing the received at least one application request using a combination of the local processing and the edge processing based on the decided processing mode being hybrid processing.

The method may further include downloading, by the UE, at least one computational module as library from the at least one edge server for processing the at least one application request locally.

According to an embodiment, a user equipment (UE) includes a memory, and a controller coupled to the memory and configured to: receive at least one application request initiated by at least one application, identify whether the received at least one application request is MEC enabled, decide a processing mode for the received at least one application request based on the received at least one application request being MEC enabled, wherein the processing mode is decided using at least one of MEC and local computing, and perform at least one action based on the processing mode decided for the initiated at least one application request.

The processing mode includes at least one of a local processing, an edge processing, and a hybrid processing.

The controller may be further configured to determine at least one parameter on initiating the at least one application request where the at least one parameter includes at least one of signal strength of at least one radio access network (RAN) supported by the UE, type of the at least one RAN, network congestion state associated with the at least one RAN, a unique identifier (UID) of the at least one application associated with the received with the received at least one application request, determine at least one of local processing time and edge processing time for the initiated at least one application request using the leaned at least one parameter and at least one machine learning (ML) table, derive a cost function for the received at least one application request, and generate a processing decision parameter based on analysis of the cost function and the determined at least one of local processing time and edge processing time for the initiated at least one application request, wherein the processing decision parameter indicates the processing mode for the initiated at least one application request.

The controller may be further configured to build the at least one ML table by fetching training data from at least one of a local processing database and an edge processing database, wherein the training data fetched from the local processing database includes information about previously determined local processing time with respect to a plurality of application requests, and the training data fetched from the edge processing database includes information about previously determined edge processing time with respect to the plurality of application requests and at least one of the signal strength of the RAN supported by the UE, the type of the RAN, the network congestion state associated with the RAN.

The controller may be further configured to build the at least one ML table by receiving edge processing capabilities from at least one edge server.

The controller may be further configured to compare the received at least one application request and the determined at least one parameter for the received at least one application request with data of the ML table, wherein the data of the ML table includes a plurality of application requests of a plurality of applications mapped with a plurality of parameters, edge processing time, and local processing time, identify at least one application request and corresponding at least one parameter of the ML table matching with the received at least one application request and the determined at least one parameter for the received at least one application request, and determine at least one of the local processing time and the edge processing time mapped with the identified at least application request and corresponding at least one parameter of the ML table as at least one of the local processing time and the edge processing time for the received at least one application request.

The controller may be further configured to assign at least one weight to at least one of the determined local processing time for the received at least one application request, the determined edge processing time for the received at least one application request, battery level of the UE, and at least one user preference, and derive the cost function as a function of the assigned at least one weight to at least one of the determined local processing time, the determined edge processing time, the battery level of the UE, and the at least one user preference.

The controller may be further configured to perform an analysis on the derived cost function and the determined edge processing time for the received at least one application request, wherein the performing of the analysis on the derived cost function comprises performing comparisons among at least one of the determined local processing time, the determined edge processing time, battery level of the UE, and at least one user preference based on associated at least one weight, and generate the processing decision parameter based on the performed analysis.

The controller may be further configured to process the received at least one application request locally based on the decided processing mode being the local processing, offload the received at least one application request to at least one edge server based on the decided processing mode being the edge processing, and process the initiated at least one application request using a combination of the local processing and the edge processing based on the decided processing mode being the hybrid processing.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Methods and systems to enable optimal utilization of a local computing and an edge computing for processing application requests with low latency are provided.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION OF EMBODIMENTS

The example embodiments herein and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Figure 1A:
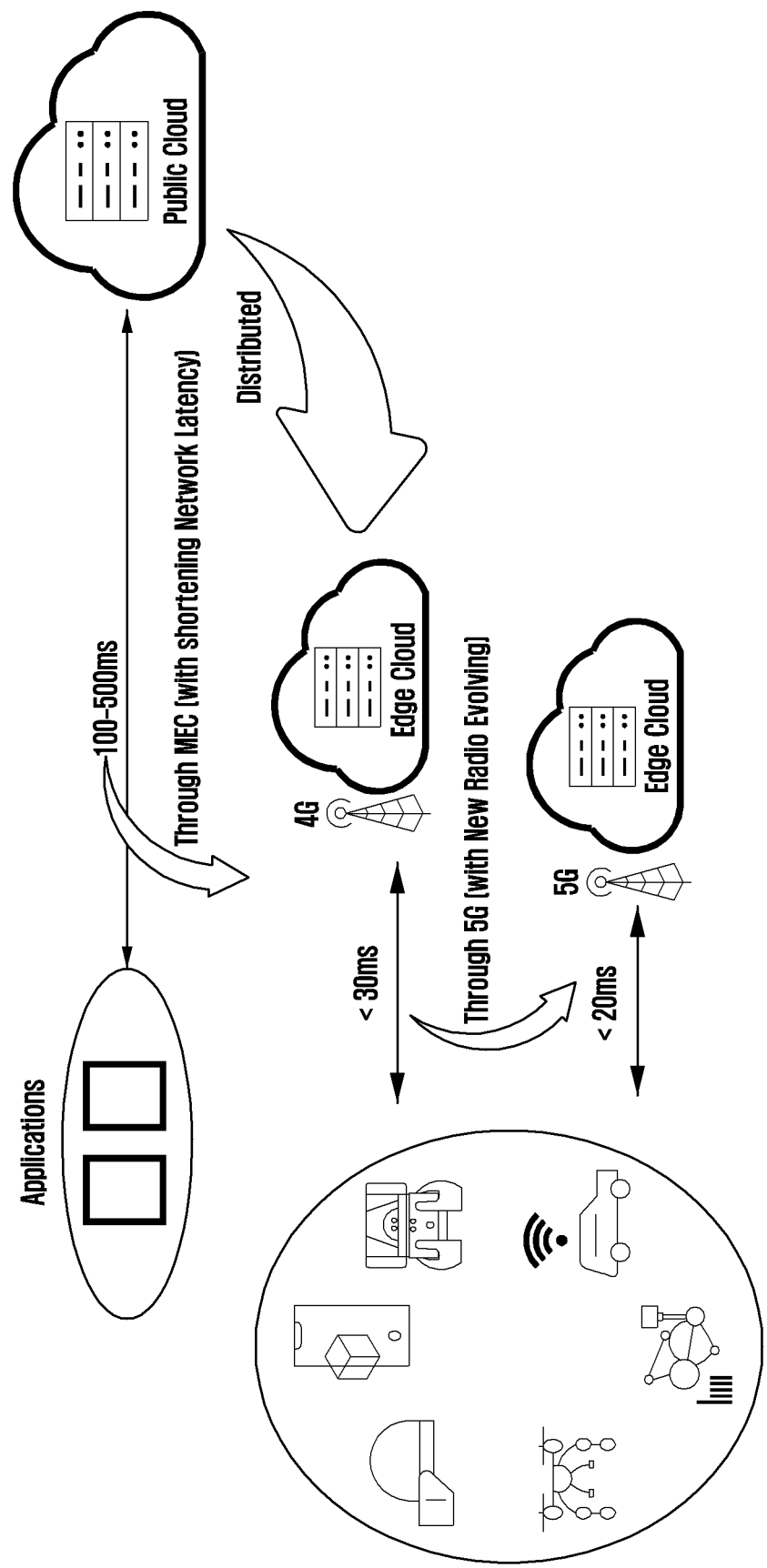
FIGS. 1A-1E depict example scenarios of processing applications in multi-access edge computing (MEC)

In general, when a user accesses at least one service from a server that runs on a centralized public cloud, the latency of the network may fluctuate. The network latency may fluctuate since a distance between the user and the server changes depending on the current user location. For example, the network latency may fluctuate from 100-500 ms as illustrated in FIG. 1A. Such a fluctuating latency can be obstacle to introduce new services that require consistent ultra-low latency. Multi-Access Edge Computing (MEC) (formerly known as mobile edge computing) may overcome such obstacle by providing the consistent low latency (for example, less than 30 ms) as illustrated in FIG. 1A.

MEC enables distribution of servers on a telecommunication edge cloud as close to the end-user as possible so that the user can access the new services by experiencing the low latency. Further, MEC may work with any communication network.

Further, using MEC, the user can offload computations related to applications running on a user device to the server distributed on the telecommunication edge cloud by availing benefits of the low network latency and server computing capabilities. However, currently in MEC, a communication network decides on offloading of computations from the user device to the server placed on the telecommunication edge cloud. However, such a network based decision making may not be always the best choice for offloading the computations from the user device to the server as the communication network may not be aware of processing capabilities of the user device.

Currently, in MEC, the processing capabilities of the user device may not be considered before making the decision to offload the computations to the server placed on the telecommunication edge cloud.

Figure 1B:
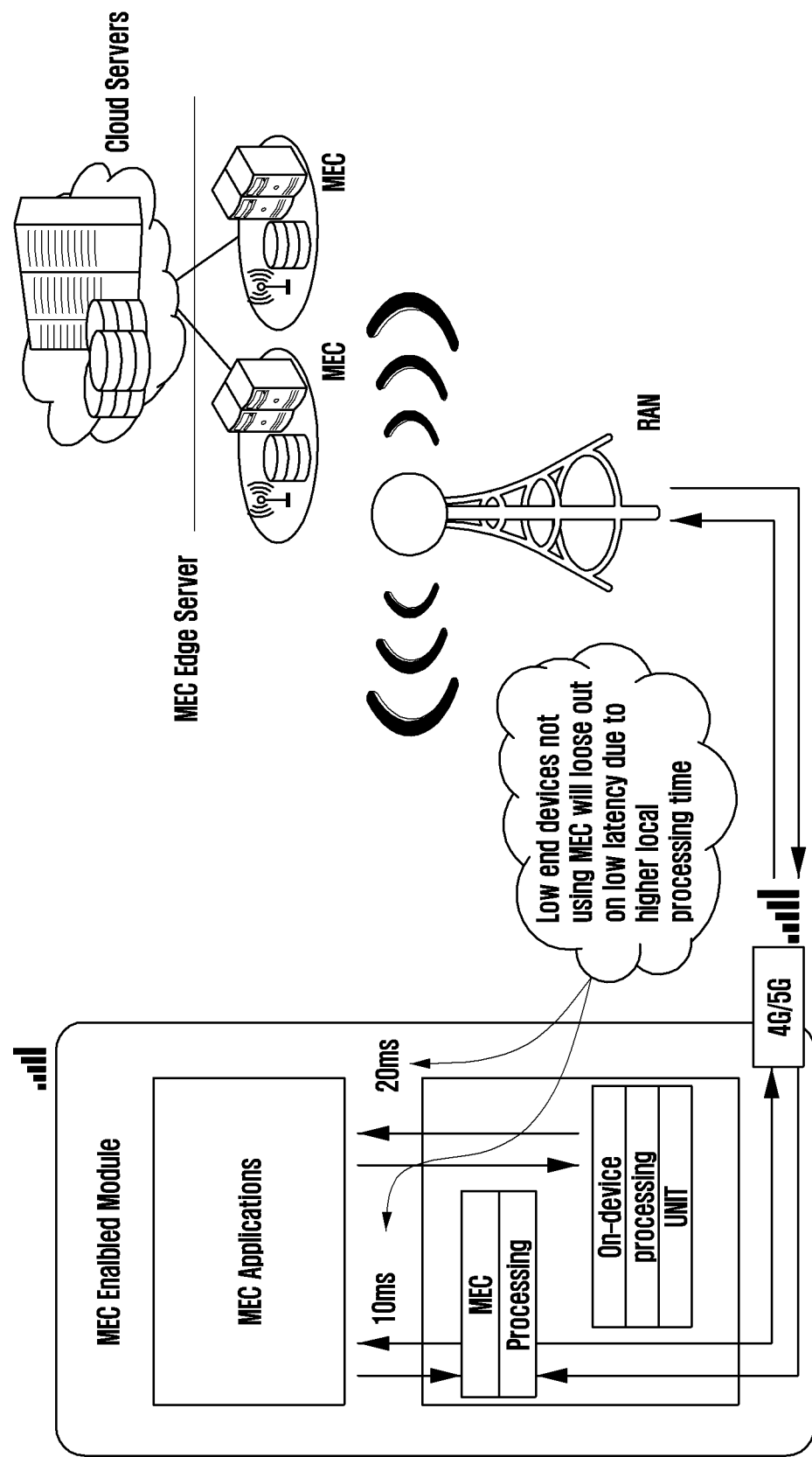

Consider an example scenario as illustrated in FIG. 1B where the user device is a low-end user device with low processing capabilities, which uses a local processing for the computations instead of offloading the computations to the server placed on the telecommunication edge cloud. In such a scenario, the low-end user device may lose out on low latency due to higher local processing time.

Figure 1C:
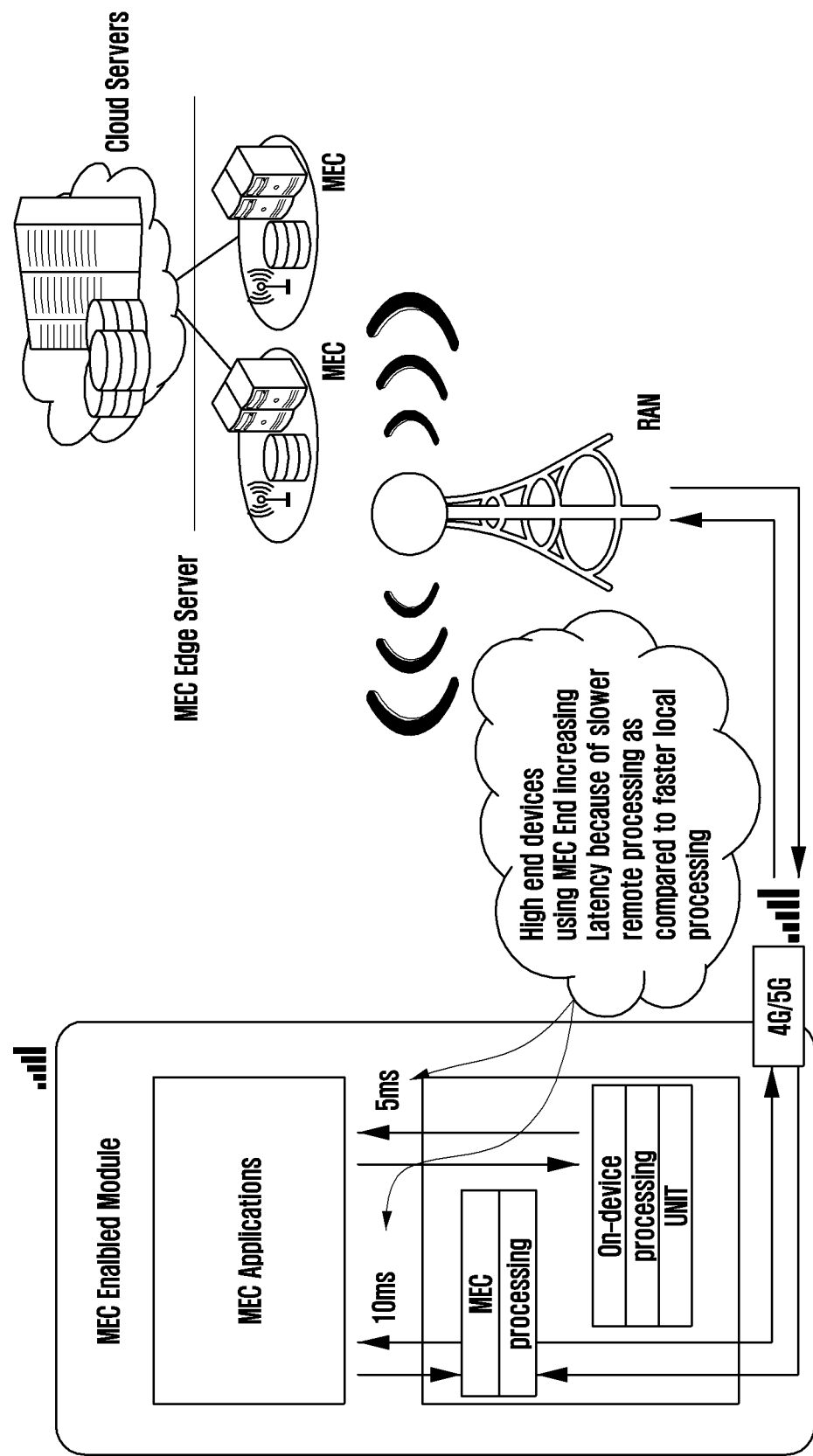

Consider an example scenario as illustrated in FIG. 1C where the user device is a high-end user device with high processing capabilities, which offloads the computations to the server placed on the telecommunication edge cloud. In such a scenario, the high-end user device may end up increasing latency due to slower remote/edge processing as compared to faster local processing.

Figure 1D:
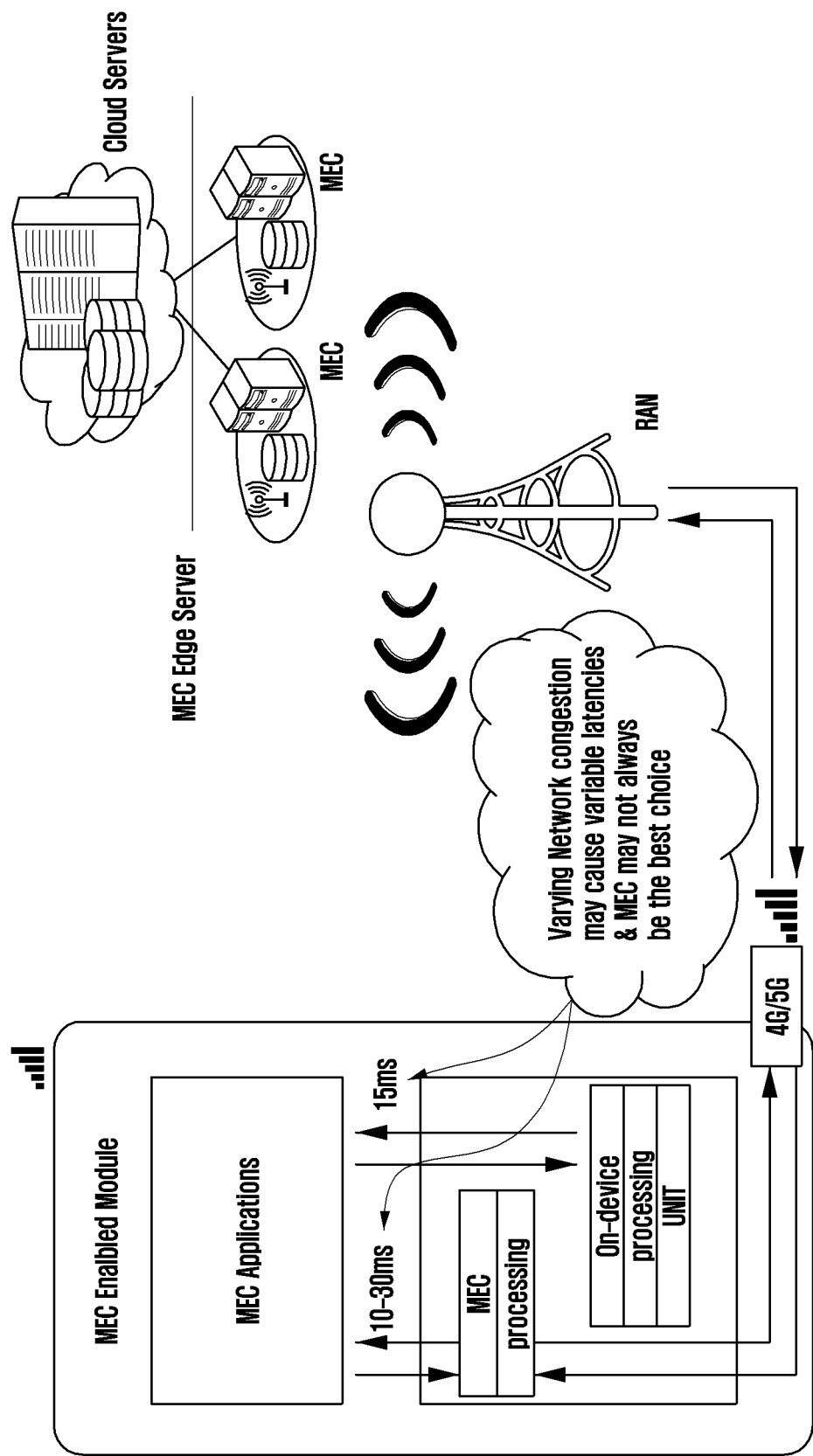

Currently, MEC cannot handle dynamic changes in network processing due to congestion. Further, varying network congestion may cause variable latencies so that offloading of the computations to the server placed on the telecommunication edge cloud may not always be the best choice for the computations as illustrated in FIG. 1D.

Figure 1E:
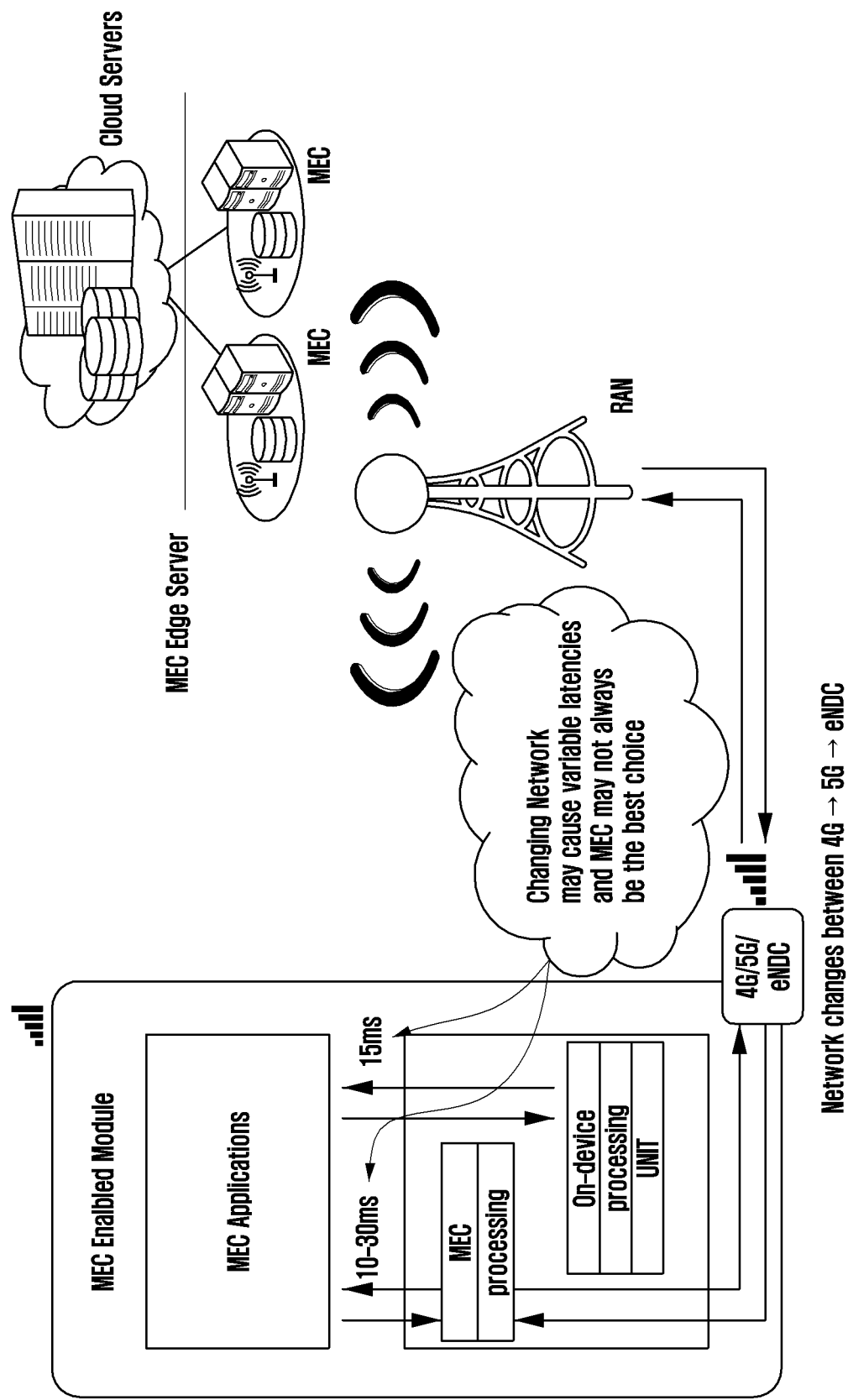

Currently, in MEC, network transition and change in communication networks (for example, 4G-5G-4G) may not be considered while making the decision to offload. The network may cause variable latencies so that offloading the computations to the server placed on the telecommunication edge cloud may not always be the best choice for the computations as illustrated in FIG. 1E.

Further, the applications may have no choice in offloading the computations to the server placed on the telecommunication edge cloud as there are no selective offloading options.

Thus, currently MEC does not involve dynamic making decisions for processing the computations with the low latency.

Embodiments herein disclose methods and systems for predicting at least one processing mode for optimizing processing of at least one application request where the processing mode includes at least one of a local processing, an edge processing and a hybrid processing. Referring now to the drawings, and more particularly to FIGS. 2A through 10 where similar reference characters denote corresponding features consistently throughout the figures, there are shown example embodiments.

Figure 2A:
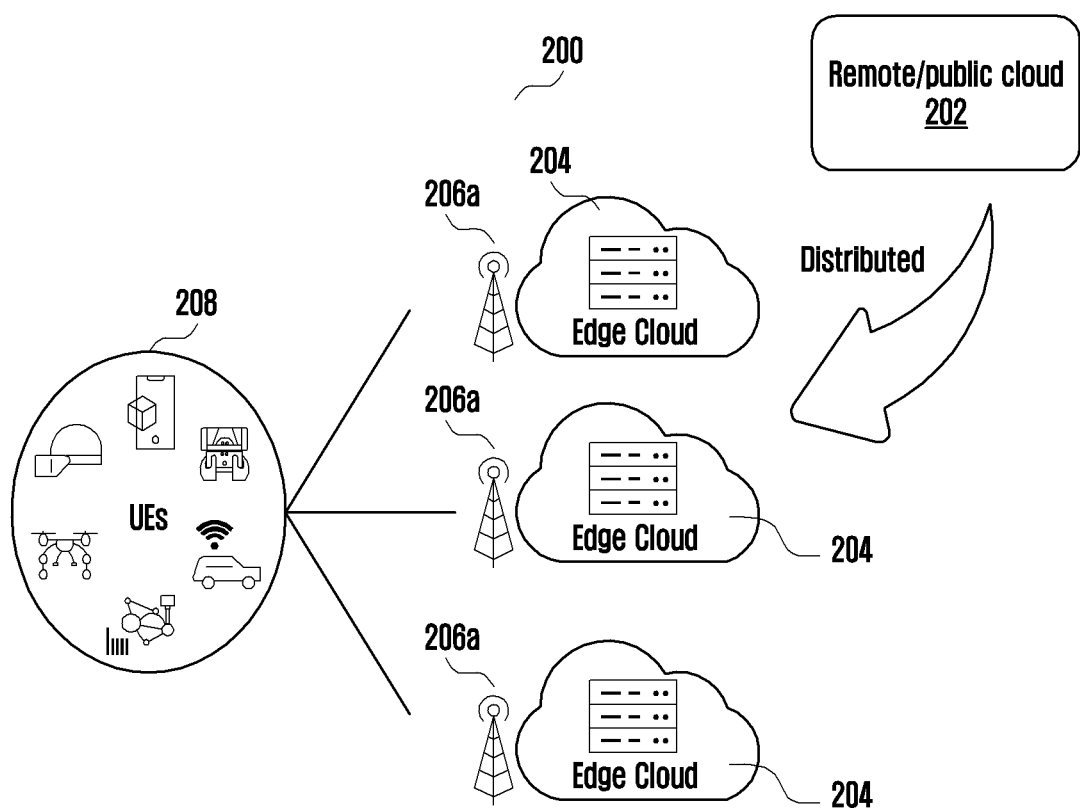
FIGS. 2A and 2B depict a MEC system, according to embodiments as disclosed herein.
Figure 2B:
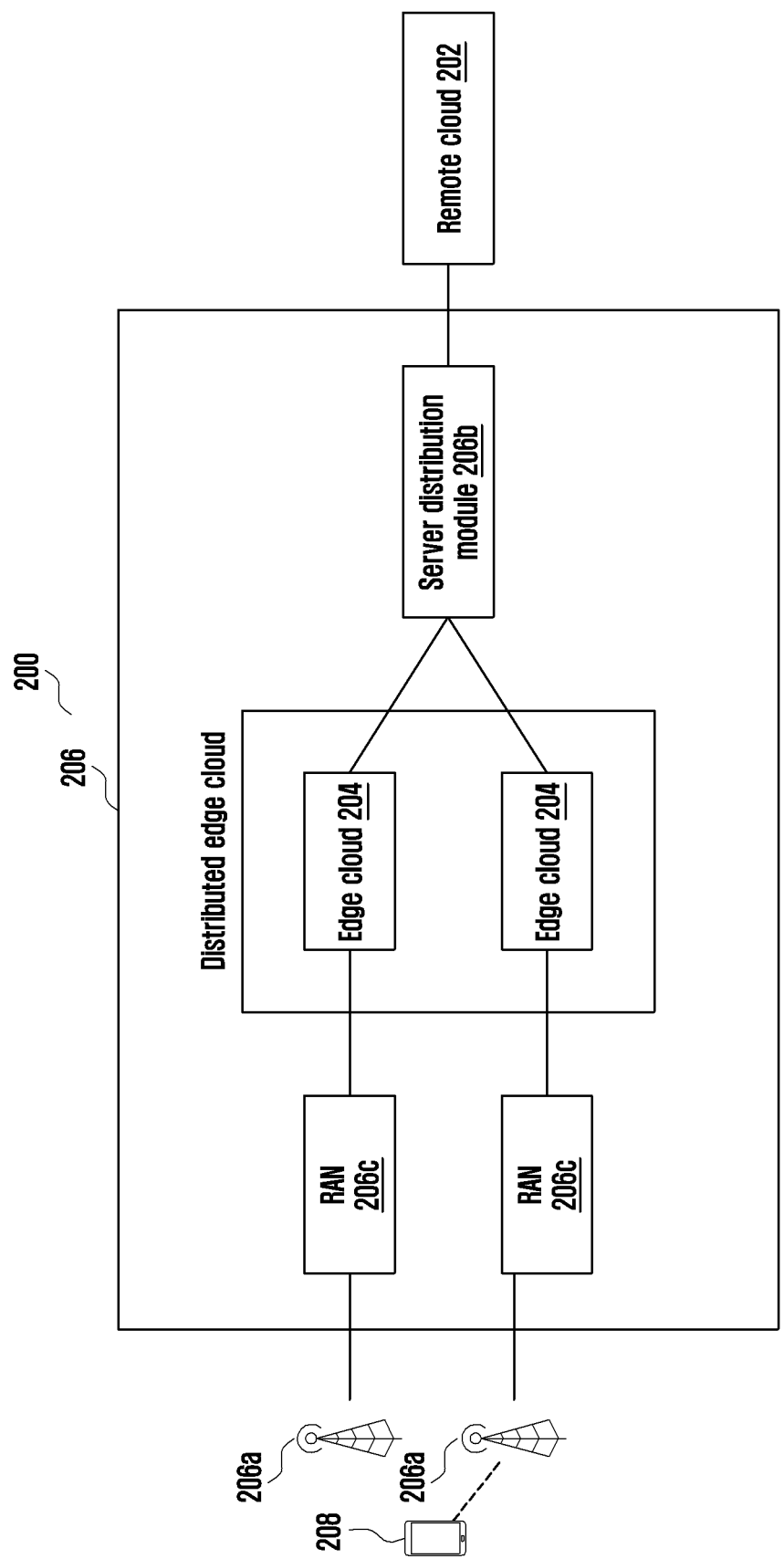

FIGS. 2A and 2B depict a multi-access edge computing (MEC) system 200 according to embodiments as disclosed herein. Multi-access edge computing (MEC) enables the implementation of MEC applications as software only entities that run on top of a virtualization infrastructure, which is located in or close to the network edge. The MEC system 200 can be configured to provide at least one of services, applications supporting the services and content to multiple users in accordance with European Telecommunications Standards Institute (ETSI) MEC. Examples of the services can be, but is not limited to, a streaming service (streaming of multimedia data such as audio, video, text and so on), a call related service, a file download service, a carousel service combining file download service and streaming service, a television (TV) service, a media on demand service, and so on. Examples of the applications can be, but is not limited to, a call related application, an Over-the Top-(OTT) application, a streaming application, a file downloading related application, a social networking application, a camera application, an IoT related application, an Augmented Reality (AR) related application, and so on. Examples of the content can be, but is not limited to, files, data, videos, audio/voice, and so on.

The MEC system 200 includes a remote cloud 202, edge servers 204, Base Stations (BSs) 206a, and User Equipments (UEs) 208.

The remote cloud 202 may include one or more servers (e.g., application servers/third party servers) for offloading at least one of the services, the applications, and contents to at least one user of the at least one UE 208. In accordance with ETSI based MEC, the remote cloud 202 may be configured to deploy, place, or distribute the one or more servers in proximity to the BSs 206a within an operator network 206 provided by different service providers/operators for achieving low latency while offloading as illustrated in FIG. 2B. Thus, the system may improve delivery of the services, the content and the applications to the user.

The operator network 206 as illustrated in FIG. 2B may include the BSs 206a, a server distribution module 206b, and so on. The BSs 206a (eNodeB/gNodeB) may be configured to enable the at least one UE 208 to communicate with at least one external device. The BSs 206a can serve cells of at least one Radio Access Network (RAN) 206c. Examples of the RAN 206c can be, but not limited to, 3rd Generation Partnership Project (3GPP), Long Term Evolution (LTE/4G), LTE-Advanced (LTE-A), 3GPP2, 5G New Radio (NR), 5G based wireless communication systems, 4G based wireless communication systems, EUTRA-NR Dual Connectivity (EN-DC/4G-5G Dual connectivity), and so on.

The server distribution module 206b can be a MEC platform that belongs to a MEC platform provider. The MEC platform can be connected with the remote cloud 202 to distribute or place the servers in proximity to one of the BSs 206a as close to the at least one UE 208 as possible. The servers 204 placed in proximity to the BSs 206a may be referred to as the edge servers 204. Embodiments herein use the terms such as, but not limited to, "edge server", "distributed edge cloud", "edge cloud", "edge server module", "MEC server", "MEC edge server", "MEC cloud", and so on interchangeably to refer to at least one server/third party server/application server of the remote cloud 202 that is placed in proximity to the BSs 206a. The at least one of the services, the applications, the content and so on present in the edge servers/MEC server 204 may be referred to as the MEC enabled services/applications/content.

The edge servers 204 can offload at least one of the services, the applications/MEC applications corresponding to the services, the content, and so on to the at least one nearby UE 208 with the low latency.

In an embodiment, the edge servers 204 may host common processing functionalities or modules that can be used by multiple applications (multiple applications' server instance) for processing their computations or requests. Examples of the computations or requests can be, but not limited to, face detection, photo processing, media (audio, video, image, or the like) processing, face tagging, object identification in the media, graphics related processing, gaming related processing, and so on. Embodiments herein use the terms such as "application requests", "computations", "computation requests", "task requests", and so on interchangeably to refer to requests initiated by the at least one application for processing. In an embodiment herein, the common computational module can be machine learning (ML) based training models. For example, the edge server 204 may host a common object training model (e.g., one of the computational modules) that can be used by the multiple applications running on the edge servers 204. Thus, hosting of the common computational modules on the edge servers 204 removes a need for the applications to have their own computational module.

In an embodiment, the edge servers 204 may also host the computational modules as libraries for the multiple applications. The computation modules can be plug-and-play libraries that can be used for processing the application requests. The edge servers 204 may enable the UE 208 to download the computational modules for processing the application requests on a demand basis locally (e.g., the computations related to the multiple applications). For example, the edge servers 204 may host photo modes (e.g., one of the computational modules) so that the UE 208 can download the photo modes from the at least one edge server 204 when the UE 208 wants to process photos/images when the camera application initiates a request to process the photos.

The UE 208 can be a MEC enabled device. Examples of the UE 208 can be, but is not limited to, a mobile phone, a smartphone, tablet, a phablet, a personal digital assistant (PDA), a laptop, a computer, a wearable computing device, a vehicle infotainment device, an Internet of Things (IoT) device, a medical equipment or any other processing devices connected to wireless modems or with radio frequency (RF) processing capabilities. The UE 208 may support one or more Subscriber Identity Modules (SIMs). Further, the one or more SIMs supported by the UE 208 may be operated by the different service providers or operators. The UE 102 may comprise one or more physical SIMs and/or one or more virtual SIMs.

The UE 208 can be connected to at least one BS 206a over an air interface so that the UE 208 can access the at least one edge server 204 placed in proximity to the at least one BS 206a. The UE 208 may also be connected to at least one of external database, external server(s), application server(s) using at least one of the Internet, a wired network (e.g., a Local Area Network (LAN), Ethernet and so on), a wireless network (e.g., a Wi-Fi network, a RAN, a Wi-Fi Hotspot, Bluetooth, Zigbee, and so on) or the like to access the applications, process the application requests, and so on.

In an embodiment, the UE 208 may include an enablement layer or MEC enabling layer that allows the UE 208 to access at least one of the applications, the content, the services, and so on from the at least one edge server 204. The enablement layer further allows the UE 208 to offload the application requests initiated by the multiple applications to the at least one edge server 204 for processing. Embodiments herein use the terms such as "MEC computing", "edge computing", "edge processing", and so on interchangeably to refer to offloading of the application requests from the UE 208 to the at least one edge processor 204 for processing.

In an embodiment, the UE 208 can be configured to utilize the MEC computing as well as local computing (e.g., processing of the applications locally by the UE 208) for optimizing processing of the applications requests. On initiating the application requests by the at least one application, the UE 208 decides a processing mode dynamically for processing the application requests.

The processing mode can be at least one of the local processing, the edge processing, and a hybrid processing. The local processing involves processing the initiated application requests locally by the UE 208. The edge processing involves offloading the initiated application requests to the at least one edge server 204 for processing. The hybrid processing includes a combination of the local processing and the edge processing for processing the initiated application requests in parallel where the application requests can be independent requests. Consider an example scenario where a social network application initiates two application requests (e.g., a first application request for face tagging and a second application request for tagging weather information for a location) and the two application requests are independent from each other. In such a scenario, the UE 208 decides the hybrid processing for processing the initiated two application requests. In an example herein, the UE 208 may process the first application request locally (e.g., the local processing) and the UE 208 may offload the second application request to the at least one edge server 204 for processing (e.g., the edge processing) so that the two application requests can be processed in parallel.

In an embodiment, the UE 208 can decide the processing mode for processing the application requests based on parameters learned using at least one machine learning (ML) method, cost comparisons between the local processing and the edge processing, and so on.

FIGS. 2A and 2B show exemplary blocks of the MEC system 200, but it is to be understood that other embodiments are not limited thereon. In other embodiments, the MEC system 200 may include less or more number of blocks. Further, the labels or names of the blocks are used only for illustrative purpose and do not limit the scope of the embodiments herein. Two or more blocks can be combined together to perform same or substantially similar function in the MEC system 200.

Figure 3:
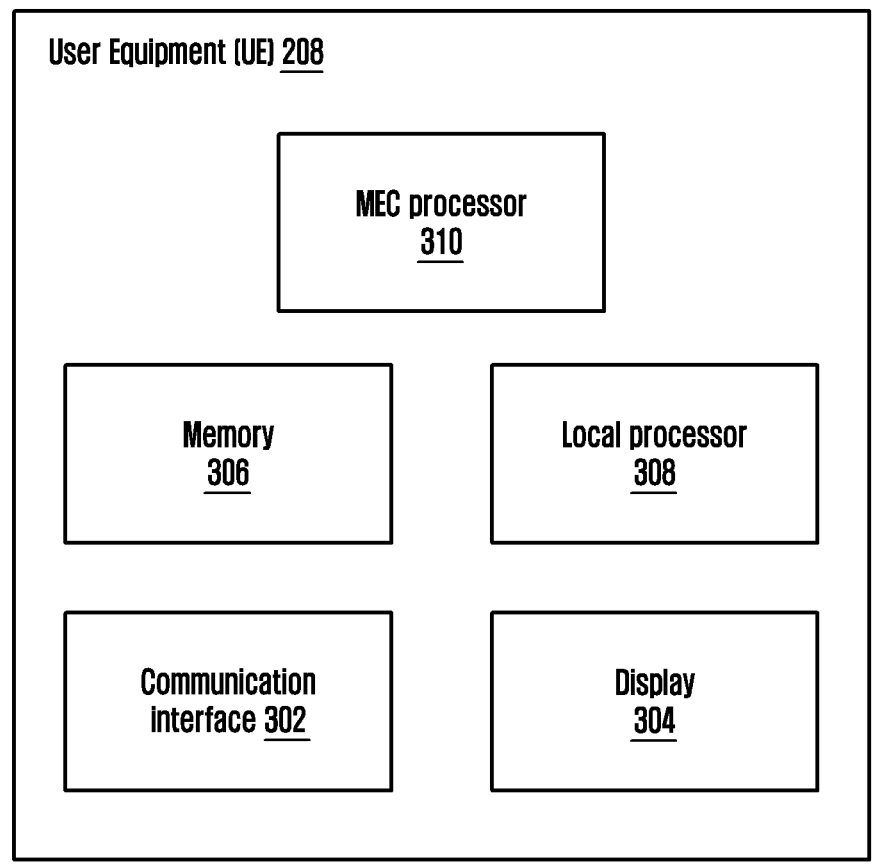
FIG. 3 depicts a User Equipment (UE), according to embodiments as disclosed herein.

FIG. 3 depicts the UE 208 according to embodiments as disclosed herein. The UE 208 includes a communication interface 302, a display 304, a memory 306, a local processor 308, and a MEC processor 310.

The communication interface 302 can be configured to enable the UE 208 to establish communication with at least one external device such as the BS 206a, the edge server(s) 204, the external database, and so on.

The display 304 can be configured to enable the user to interact with the UE 208. In an embodiment, the display 304 can be configured to receive user preferences from the user. The user preferences can indicate whether the user has selected the local processing or the edge or MEC processing as a default mode or option for processing the application requests.

The memory 306 can store the applications, the content, the user preferences, information about the UE 208 such as battery level, processing capabilities of the local processor 308, and so on, information about the at least one edge server 204, and so on. The memory 306 may also store program instructions or program code that can be executed on the MEC processor 310 to perform one or more steps for predicting the at least one processing mode for processing the application requests initiated by the at least one application. The memory 306 may include one or more computer-readable storage media. The memory 306 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 306 may, in some examples, be considered as a non-transitory storage medium. The term "non-transitory" may indicate that the storage medium is not embodied in a carrier wave or a propagated signal. However, the term "non-transitory" should not be interpreted to mean that the memory 306 is non-movable. In some examples, the memory 306 can be configured to store larger amounts of information than the memory. In certain examples, a non-transitory storage medium may store data that can, over time, change (e.g., in Random Access Memory (RAM) or cache).

The local processor 308 can be at least one of a single processor, a plurality of processors, multiple homogenous cores, multiple heterogeneous cores, multiple Central Processing Unit (CPUs) of different kinds and so on. The local processor 308 can be configured to process or compute the application requests initiated by the multiple applications locally. In an embodiment, the local processor 308 can process the application requests using the computational modules, that are downloaded by the MEC processor 310 from the at least one edge server 204.

The MEC processor 310 can be at least one of a single processor, a plurality of processors, multiple homogenous cores, multiple heterogeneous cores, multiple Central Processing Unit (CPUs) of different kinds and so on. In an embodiment, the MEC processor 310 may also communicate with the at least one external database using at least one of the Internet, a wired network (e.g., a Local Area Network (LAN), Ethernet and so on), a wireless network (e.g., a Wi-Fi network, a RAN, a Wi-Fi Hotspot, Bluetooth, Zigbee and so on) or the like. The at least one external database can be at least one of a processing decision database 502*a*, a ML based database 502*b*, a local processing based database 502*c*, an edge processing based database 502*d*, and so on. In an embodiment, the memory 306 may also include information hosted on the at least one external database.

The processing decision database 502*a* may include information about the processing modes selected for different applications. The ML based database 502*b* includes ML table/model or training/learning data. The training data can include information about the edge processing time determined previously with respect to a unique identifier (UID) of the at least one application and various parameters and the local processing time determined with respect to the UID of the at least one application. The UID can be a serial number type of unique identifier that can be assigned for each application that is having the edge server instance. The edge processing time can be time taken by the at least one edge server 204 to process the at least one application request initiated by the at least one application. The local processing time can be time taken by the local processor 308 of the UE 208 to process the at least one application request initiated by the at least one application locally. The various parameters can be, but not limited to, signal strength of the RAN supported by the UE 208, RAN type, network congestion state, and so on.

The edge processing based database 502*d* may include information about the edge processing time determined with respect to the UID of the at least one application and the various parameters. The local processing based database 502*c* may include the local processing time determined with respect to the UID of the at least one application.

The MEC processor 310 can be configured to decide the processing mode for processing the application requests. In an embodiment, the MEC processor 310 can be the local processor 308. The local processor 308 may perform at least one intended function of the MEC processor 310.

In an embodiment, the MEC processor 310 performs the application task management within the UE 210 in the MEC environment. The MEC processor 310 determines whether the application associated with the task/application request is MEC enabled. For instance, the MEC processor 310 determines the availability of the edge server for the application. On determining that the application is MEC enabled, the MEC processor 310 measures the plurality of network parameters and time associated with a processing of the task/application request using the MEC server/edge server 204. Further, the MEC processor 310 estimates the processing capability of the UE 208 to execute the at least one task corresponding to the at least one application within the UE 208. The MEC processor 310 causes the UE 208 to make a decision to execute the task/application request corresponding to the MEC enabled application using the MEC server or within the UE 208 such that application execution time is minimum. The UE 208 can make the decision to execute the task/application request based on minimum time required to execute the at least one task.

Figure 4:
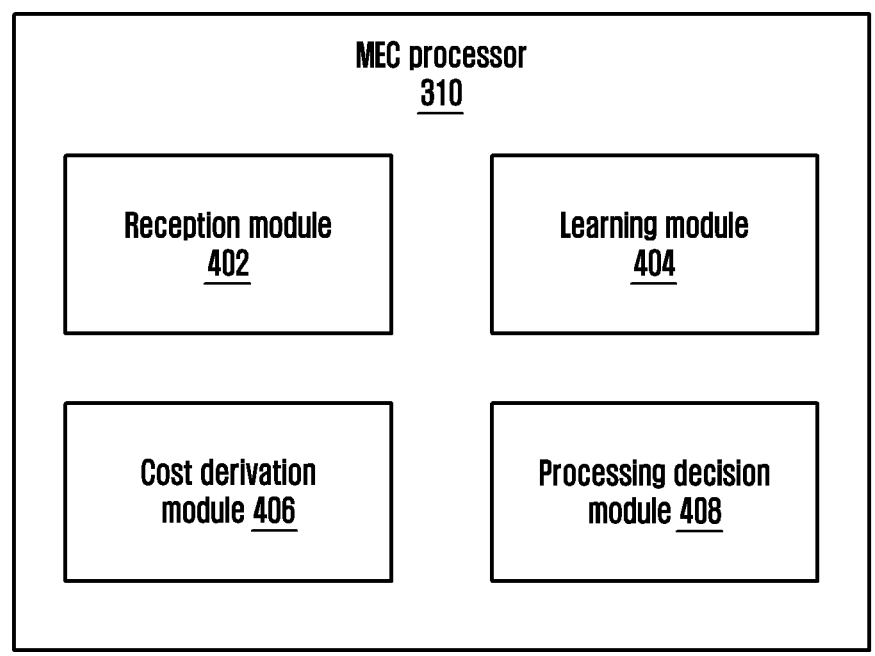
FIG. 4 is a block diagram illustrating various modules of a MEC processor, according to embodiments as disclosed herein.

As illustrated in FIG. 4, the MEC processor 310 includes a reception module 402, a learning module 404, a cost derivation module 406, and a processing decision module 408. The reception module 402 can be configured to receive the application requests initiated by the at least one application. The at least one application can initiate the application requests based on inputs received from the user of the UE 208 interacting with the user.

The learning module 404 can be configured to build the ML table/learning model. In an embodiment, for building the ML table/learning model, the learning module 404 fetches training data from at least one of the memory 306, the local processing based database 502*c*, the edge processing based database 502*d*, and so on. The training data can be, but not limited to, the edge processing time determined previously with respect to the UID of the at least one application and the various parameters (e.g., the signal strength, the RAN type, the network congestion state, or the like), the local processing time determined previously with respect to the UID of the at least one application, and so on. The learning module 404 can use the training data to build the ML table/learning model. In an example, the built learning module may be a Support Vector Machine (SVM) type classification model for the UID of the at least one application where vectors of the SVM model may represent the training data. In an example, the learning model may be a regression ML model for the UID of the at least one application. The learning module 404 may update the ML based database with the built ML table/learning model.

In an embodiment, the learning module 404 may fetch training data from the at least one edge server 204 when the UE 208 connects to the at least one edge server 204 initially. The training data can be a mean of crowd-sourced data. In an embodiment, for deriving the mean of crowd-sourced data, the edge servers 204 enable the UEs to upload the ML model/learning models using REST Application Programming Interfaces (APIs) with application signatures (pkgname). The at least one edge server 204 derives the mean of crowd-sourced data value from the learning models uploaded by the different UEs to the at least one edge server 204. The mean of crowd-sourced data can be derived by averaging the information of the learning models uploaded by the UEs. The at least one edge server 204 may provide the derived mean of the crowd-sourced data to the UE 208 when the UE 208 connects to the at least one edge server 204 for a first time. The learning module 404 may extract edge processing capabilities of the at least one edge server 204 through the mean of crowd-sourced data and updates the ML based database 502b with the edge processing capabilities. The edge processing capabilities can be at least one of the edge processing time, processing capabilities of the edge server in terms of load, a number of operations that the edge server can execute per second and can be expressed in terms of megahertz (MHs) or gigahertz (GHz), a number of dedicated cores available to the connected UE, and so on. Thus, the UE 208 may not be required to build the learning model.

In an embodiment, the learning module 404 may fetch information about edge processing capabilities from the at least one edge server 204 by performing a handshake with the at least one edge server 204. The learning module 404 enables the UE 208 to perform the handshake with the at least one edge server 204 for authentication. On successful authentication, the UE 208 requests the at least one edge server 204 for the edge processing capabilities. In response to the request for the edge processing capabilities, the learning module 404 receives the mean of crowd-sourced data as initial training data along with the edge processing capabilities from the at least one edge server 204. The learning module 404 uses the mean of crowd-sourced data and the edge processing capabilities to build the ML table/learning model. The learning module 404 stores the built ML table/learning model in at least one of the ML based database 502b and the memory 306. The stored ML table/learning model includes information about the edge processing capabilities with respect to the various parameters.

In an embodiment, the learning module 404 can also upload the built ML table/learning model to the at least one edge server 204 and/or the remote cloud 202. The learning module 404 can upload the built ML table/learning model using the REST APIs along with the application signatures.

The learning module 404 can also be configured to use the built ML table/learning model to predict the edge processing time and the local processing time for the application requests, initiated by the at least one application. On receiving the application requests from the reception module 402, the learning module 404 determines the various parameters at a current instance of time by accessing a device state system. The various parameters can be, but not limited to, signal strength of the RAN supported by the UE 208, RAN type, network congestion state, the UID of the at least one application which has initiated the application requests, and so on. In an embodiment, the learning module 404 accesses at least one of the ML based database 502b and the memory 306 and fetches the ML table/learning model. The learning module 404 passes the learned parameters as key values to the fetched ML table for predicting the edge processing time and the local processing time for the UID of at least one application, which has initiated the application requests. For predicting the local processing time, and the edge processing time, the learning module 404 compares the initiated application request and the determined at least one parameter for the initiated application request with data of the ML table where the data of the ML table includes the plurality of application requests of the plurality of applications mapped with the plurality of parameters, the edge processing time, and the local processing time. The learning module 404 identifies the application request and corresponding at least one parameter of the ML table that matches with the initiated application request and the determined at least one parameter for the initiated application request. The learning module 404 further predicts the local processing time and the edge processing time mapped with the identified request and the corresponding at least one parameter of the ML table as at least one of the local processing time and the edge processing time for the initiated application request. The learning module 404 provides information about the predicted edge processing time, and the predicted local processing time to the cost derivation module 406. The learning module 404 also provides the predicted edge processing time to the processing decision module 408.

The cost derivation module 406 can be configured to derive the cost function for the initiated application requests. In an embodiment, the cost derivation module 406 derives the cost function based on at least one of the predicted edge processing time, the local processing time, battery level of the UE 208, and the user preference. The cost derivation module 406 may fetch at least one of the user preference and default preference automatically selected from the memory 306. Based on the fetched user preference, the processing decision module 408 checks if the user has selected the local processing as a default mode for processing the task requests initiated by the at least one application. The processing decision module 408 also determines battery level of the UE 208 by checking the device state system.

In an embodiment, for deriving the cost function, the cost derivation module 406 assigns suitable weight(s) to at least one of the edge processing time, the local processing time, battery level of the UE 208, and the user preference. The cost derivation module 406 may assign the suitable weights using a pre-defined table/database where the weights indicates the priority of elements (e.g., the edge processing time, the local processing time, battery level of the UE 208, and the user preference) while calculating the cost function. Based on the assigned weights, the cost derivation module 406 derives the cost function. The cost function can be derived using the below equation:

$$\text{Cost} = wf_n \text{ (edge processing time, local processing time, batery consumed, user preference)}$$

The cost derivation module 406 further provides the derived cost function to the processing decision module 408.

The processing decision module 408 can be configured to decide the processing mode for processing the application requests. The processing decision module 408 performs analysis of the cost function based on the weights assigned to at least one of the edge processing time, the local processing time, battery level of the UE 208, and the user preference, and the edge processing time predicted using the learning model by the learning module 404. The processing decision module 408 derives a processing decision parameter based on the analysis of the cost function and the edge processing time predicted using the learning model. The analysis may involve at least one of comparison between the local processing time and the edge processing time, comparison between the local processing time and the edge processing time along with the user preference and/or the battery level of the UE 208, comparison of the battery level with a pre-defined battery level, checking of the user preference and so on. The pre-defined battery level may be a battery level defined by the user. The pre-defined battery level may also be defined by the UE 208 automatically. The pre-defined battery level may be a learning value that is learned using data from fail cases in use of the edge processing from the multiple UEs. The processing decision parameter indicates the processing mode that can be used for processing the application requests. The processing mode can be at least one of the local processing, the edge processing, and the hybrid processing. In case of hybrid processing mode, the local processing and the edge processing may be specified for each application request. The processing decision module 408 updates the processing decision database 502a with the decided processing mode.

Consider an example scenario where a camera application initiates two application requests such as for photo editing, and location tagging simultaneously. In such a scenario, the processing decision module 408 generates the processing decision parameter for processing the two application requests. In an example, for generating the processing decision parameter, the processing decision module 408 compares the local processing time and the edge processing time. If the local processing time is less than the edge processing time, the processing decision module 408 generates the processing decision parameter as the local processing for processing the two application requests of the camera application. If the local processing time is greater than the edge processing time, the processing decision module 408 accesses the user preference to check if the user has selected the local processing as the default processing mode and/or checks the battery level of the UE 208. If the user has selected the local processing as the default processing mode and/or the battery level is greater than the pre-defined battery level, the processing decision module 404 generates the processing decision parameter as the local processing mode for processing the application requests of the camera application. If the user has not selected the local processing as the default processing mode and/or the battery level is less than the pre-defined battery level, then the processing decision module 404 generates the processing decision parameter as the edge processing mode for processing the application requests of the camera application.

Consider an example scenario where a social networking application initiates two application requests such as for identifying faces of users present in a photo, and weather update for the location, where the photo has captured simultaneously and the two application requests can be processed simultaneously. In such a scenario, the processing decision module 408 generates the processing decision parameter for processing the two application requests. In an example, the processing decision module 408 compares the local processing time and the edge processing time along with the user preference and the battery level. In an example, consider that the processing decision module 408 determines that the local processing time is less than the edge processing time, and the battery level is greater than the pre-defined threshold, and/or the user has selected the local processing as the default mode for processing a first request (e.g., request for identifying faces) of the social networking application. The processing decision module 408 further determines that the local processing time is greater than the edge processing time, and the user has not selected the local processing as the default mode for processing a second request (e.g., request for weather update). In such a case, the processing decision module 408 generates the processing decision parameter as the hybrid processing by indicating the local processing for processing the first request and the edge processing for processing the second request of the social networking application.

Once the processing decision parameter is generated, the processing decision module 408 checks if the processing decision parameter indicates the local processing. If the processing decision parameter indicates the local processing, the processing decision module 408 provides instructions to the local processor 308 to process the application requests.

In an embodiment, the processing decision module 408 may download the computational modules as libraries corresponding to the initiated application requests from the at least one edge server 204. The processing decision module 408 further provides the downloaded computational modules to the local processor 308 for processing the application requests. Consider an example scenario where the camera application initiates an application request for processing images/photos. In such a scenario, the processing decision module 408 decides the local processing as the best mode for processing the images. Once the local processing is decided for the camera application, the processing decision module 408 downloads photo modes (e.g., the computational modules) from the at least one edge server 204 on demand basis for processing the photos. Thus, this removes a need for the applications on the UE 208 to have their own computational module.

If the processing decision parameter indicates the edge processing, then the processing decision module 408 transmits the application requests and the UID of the corresponding application to the at least one edge server 204 which can be the closest edge server that is determined according to the ETSI specification for processing.

If the processing decision parameter indicates the hybrid processing (e.g., requirement of the local processing and the edge processing) for processing the application requests, the processing decision module 408 provides the instructions along with the application request(s) specified for the local processing and the UID of the corresponding application to the local processor 308 for processing locally and transmits the application request(s) specified for the edge processing and the UID of the corresponding application to the at least one edge server for processing.

FIGS. 3 and 4 show exemplary blocks of the UE 208, but it is to be understood that other embodiments are not limited thereon. In other embodiments, the UE 208 may include less or more number of blocks. Further, the labels or names of the blocks are used only for illustrative purpose and do not limit the scope of the embodiments herein. Two or more blocks can be combined together to perform same or substantially similar function in the UE 208.

Figure 5:
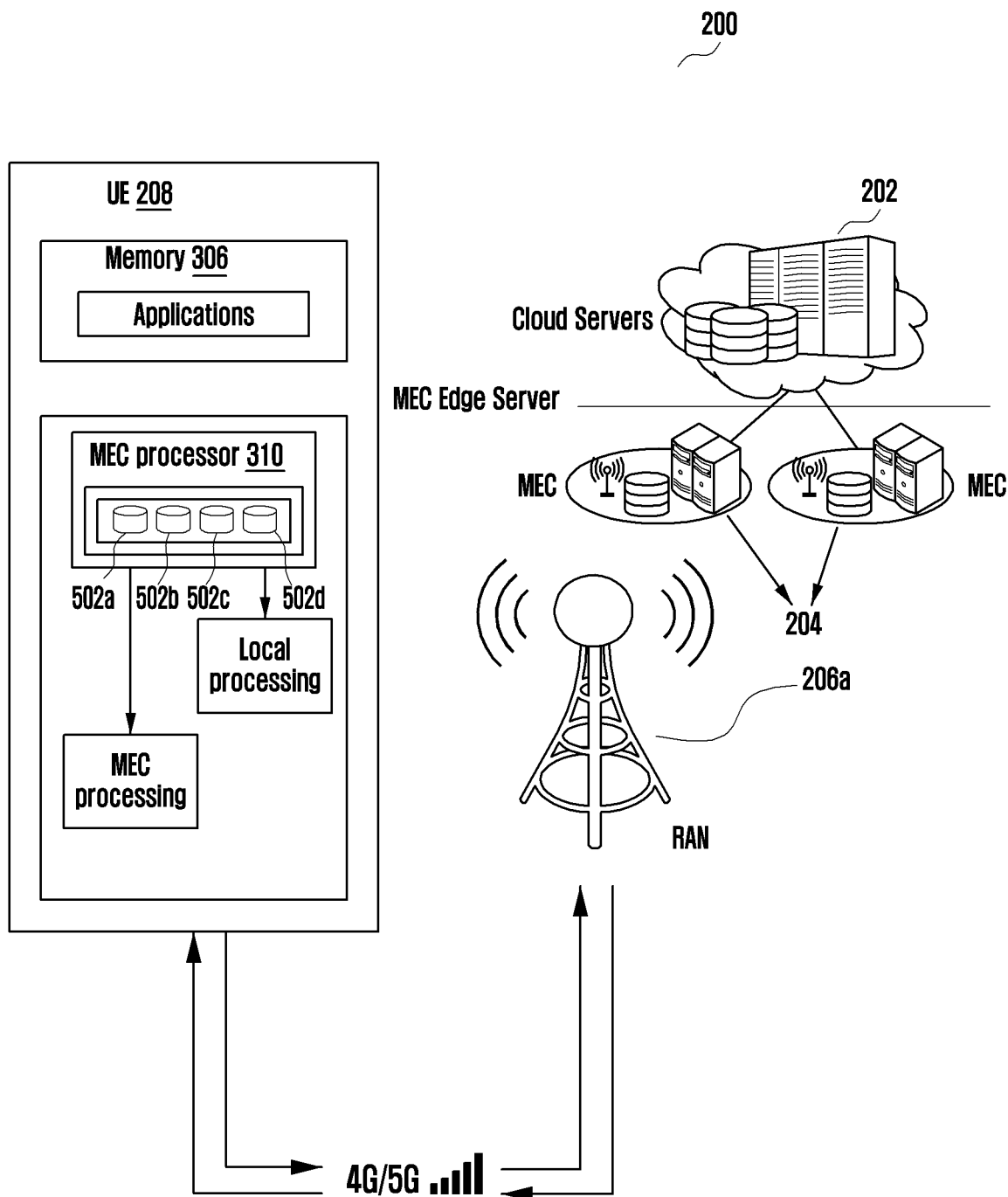
FIG. 5 depicts an example MEC system, according to embodiments as disclosed herein.

FIG. 5 depicts an example MEC system 200 according to embodiments as disclosed herein. In an example herein, the UE 208 may be connected to the at least one BS 206a and may access the services, the applications, the content, and so on from the at least one edge server 204 that is deployed near to the BS 206a. The UE 208 may be connected to the at least one BS 206a using the at least one RAN.

The UE 208 includes the memory 306, the local processor 308 and the MEC processor 310. The memory 306 includes the plurality of applications. The local processor 308 can be configured to process the application requests initiated by the plurality of applications. The MEC processor 310 can be configured to intercept the initiated application requests and select or decide the best processing mode for processing the initiated application requests. In an embodiment, the MEC processor 310 may decide the best processing mode based on analysis of the cost function and the edge processing time predicted using the ML table/learning model. The best processing mode can be at least one of the local processing, the edge processing, and the hybrid processing. Thus, this enables optimal utilization of the MEC computing along with the local computing for processing the application requests with low latency.

Figure 6:
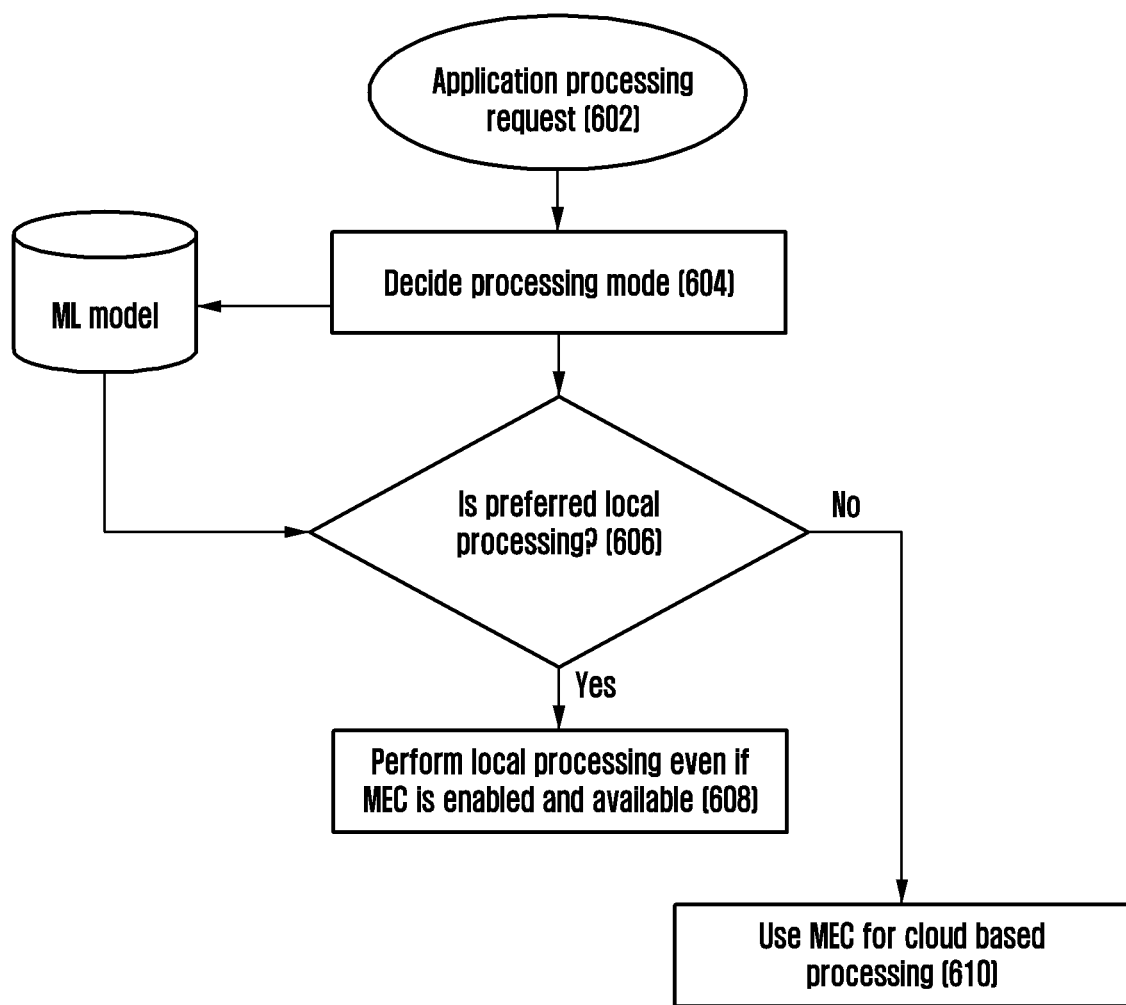
FIG. 6 is an example flow diagram illustrating a method for optimizing processing of application requests on the UE with low latency, according to embodiments as disclosed herein.

FIG. 6 is an example flow diagram illustrating a method for optimizing processing of the application requests on the UE 208 with low latency according to embodiments as disclosed herein. Embodiments herein enable the MEC processor 310 of the UE 208 to decide the processing mode for optimized processing of the application requests on the UE 208.

The MEC processor 310 receives the application requests from the at least one application (operation 602). For optimal processing of the application requests, the MEC processor 310 generates the processing decision parameter based on analysis of the cost function derived for the initiated application requests and the edge processing time predicted using the ML table/learning model. The MEC processor 310 checks the processing decision parameter to determine the processing mode for processing the application requests (operation 604). On determining that the local processing is not decided to be the processing mode (operation 606, No), the MEC processor 310 uses the MEC for cloud based processing of the initiated application requests (operation 610).

On determining that the local processing is decided to be the processing mode (operation 606, Yes), the MEC processor 310 instructs the local processor 308 to process initiated application requests even if the MEC is enabled on the UE 208 and the edge server 204 is available (operation 608). Thus, processing of the application requests can be performed efficiently by selecting a best combination of the local processing as well as the edge processing.

Figure 7:
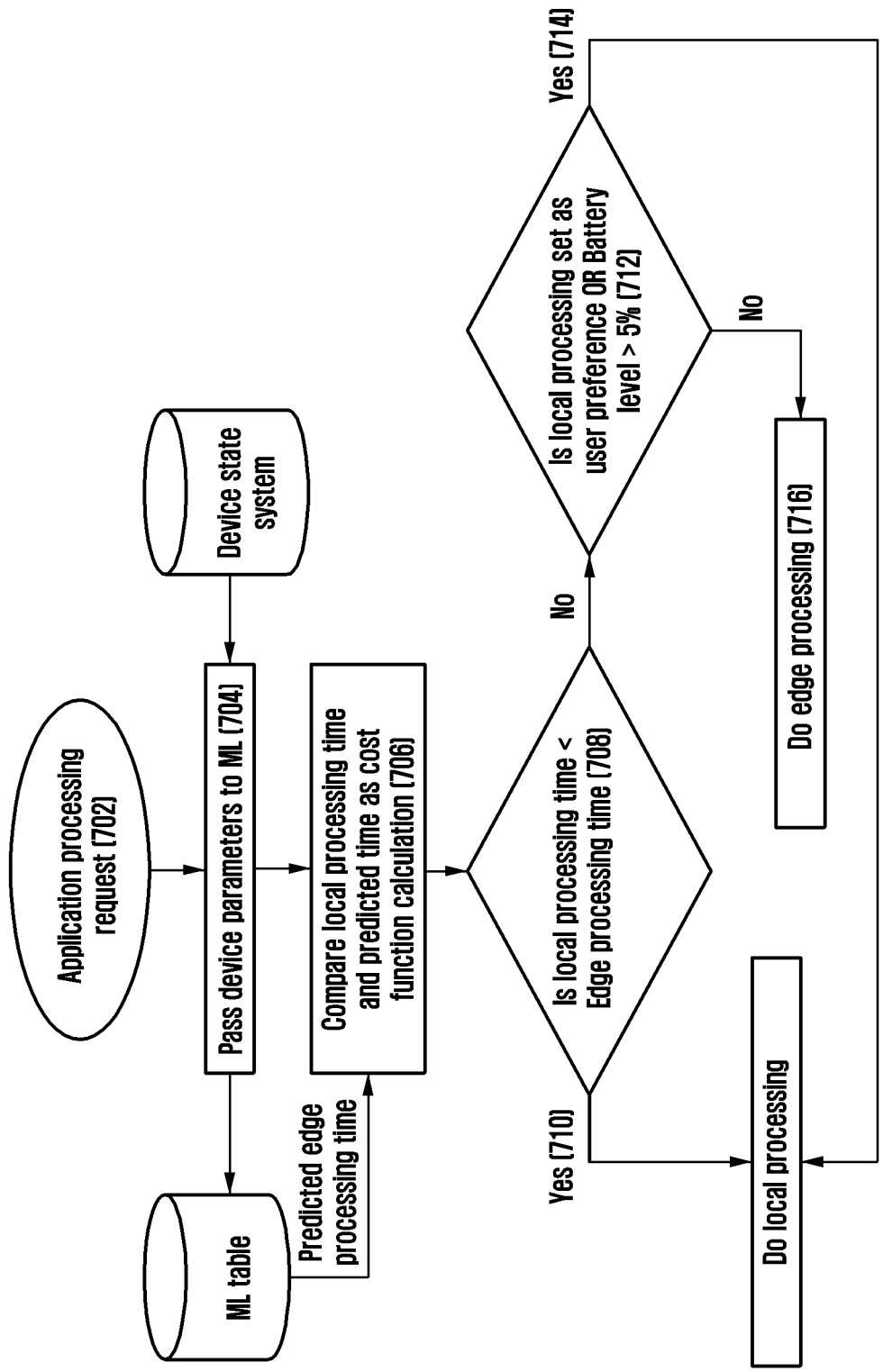
FIG. 7 is an example flow diagram illustrating a method for deciding a processing mode for processing the application requests on the UE, according to embodiments as disclosed herein.

FIG. 7 is an example flow diagram illustrating a method for deciding the processing mode for processing the application requests on the UE 208, according to embodiments as disclosed herein. The MEC processor 310 receives the application requests initiated by the at least one application (operation 702). The MEC processor 310 learns the various parameters by accessing the device state system. The parameters can be, but not limited to, signal strength of the RAN supported by the UE 208, RAN type, network congestion state, the UID of the corresponding application, and so on.

The MEC processor 310 accesses the ML based database and fetches the built ML table/learning model (operation 704). The MEC processor 310 further compares the learned parameters with the ML table/learning model and predicts the edge processing time and local processing time for processing the initiated application requests (operation 706). The MEC processor 310 derives the cost function using at least one of the local processing time, edge processing time, the battery level and the user preference and compares the edge processing time with the local processing time.

The MEC processor 310 checks if the predicted local processing time is less than the predicted edge processing time (operation 708). The MEC processor 310 decides the local processing as the best mode for processing the task requests of the application if the local processing time is less than the predicted edge processing time (operation 710). If the local processing time is not less than the predicted edge processing time, the MEC processor 310 checks if the user has selected the local processing as the default mode for the at least one application, which has initiated the application requests and/or if the battery level is greater than the pre-defined level, for example, 5% (operation 712). If the user has selected the local processing as the default mode and/or the battery level is greater than the pre-defined value, then the MEC processor 310 decides the local processing as the best mode for processing the initiated application requests (operation 714). If the user has not selected the local processing as the default mode and the battery level is not greater than the pre-defined value, the MEC processor 310 decides the edge processing as the best mode for processing the initiated application requests (operation 716).

Figure 8A:
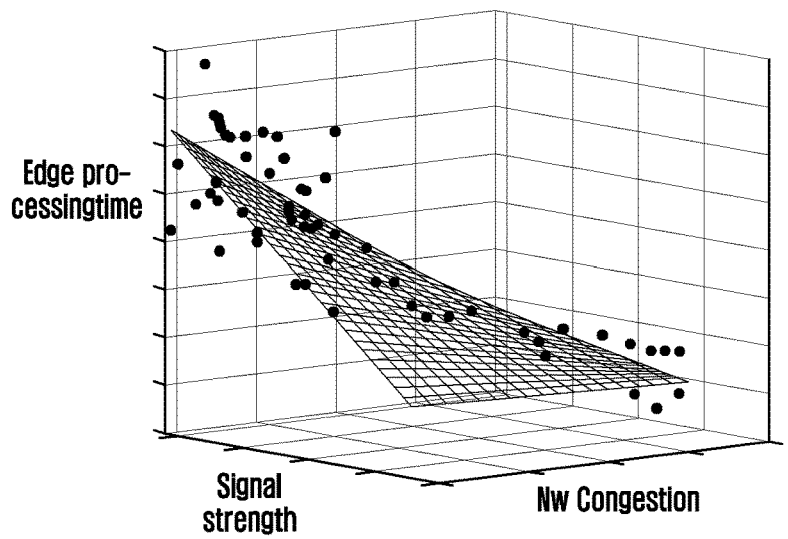
FIGS. 8A, 8B and 8C are example diagrams illustrating training data used for building of a machine learning (ML) table/learning model, according to embodiments as disclosed herein.
Figure 8B:
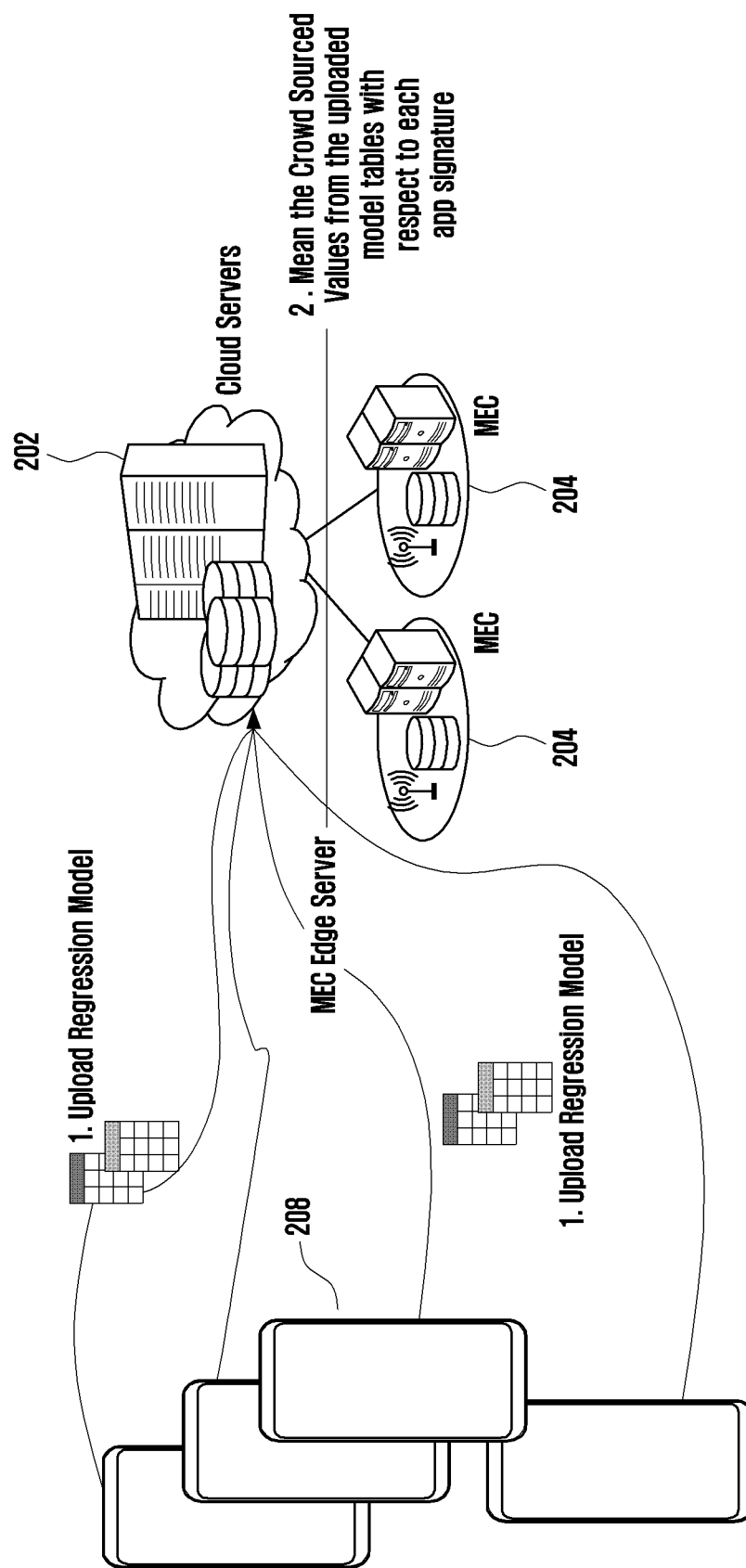
Figure 8C:
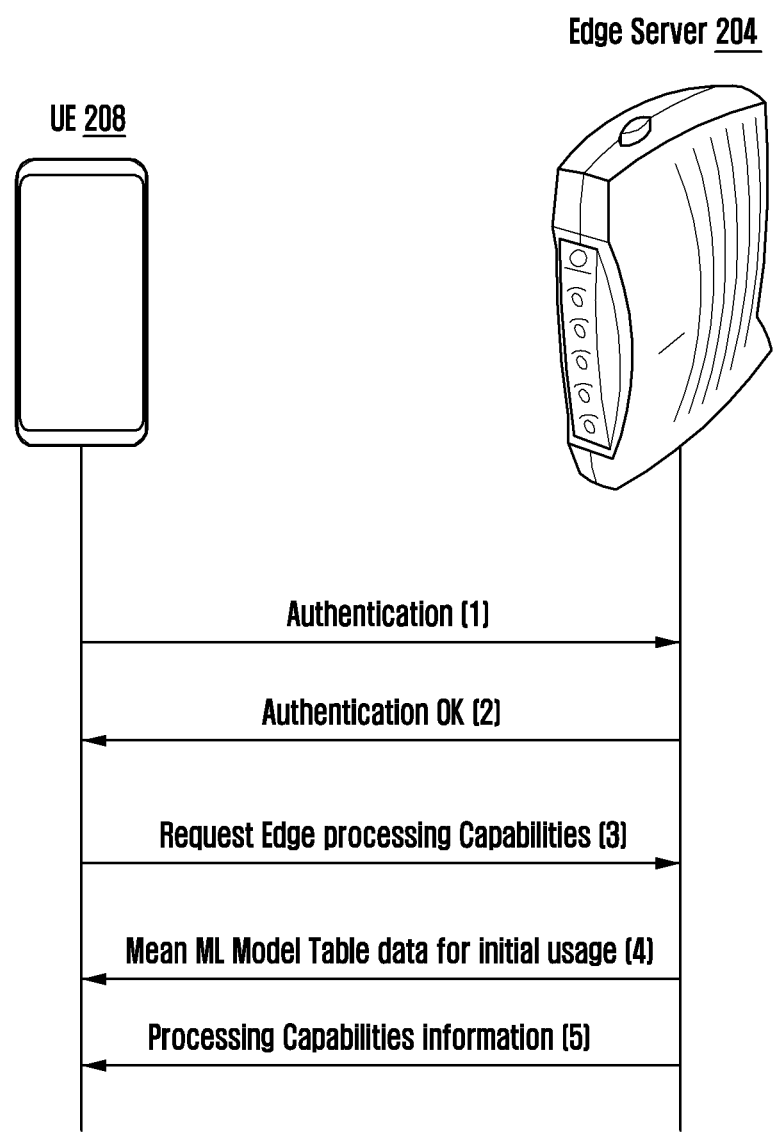

FIGS. 8A, 8B and 8C are example diagrams illustrating the training data used for building of the ML table/learning model, according to embodiments as disclosed herein. Embodiments herein enable the MEC processor 310 to build the ML table/learning model for deciding the processing mode to optimize the processing of the application requests.

In an embodiment, for building the ML table/learning model, the MEC processor 310 fetches the training data by accessing the local processing based database 502c and the edge processing based database 502d. The training data fetched from the local processing based database 502c may include the information about the local processing with respect to the various UIDs of the applications. The training data fetched from the edge processing based database 502d includes information about the edge processing time with respect to the various UIDs of the applications and the various parameters such as the signal strength, the RAN type, the network congestion state, or the like. Example training data fetched from the local processing based database and the edge processing based database is illustrated in FIG. 8A. The MEC processor 310 uses the training data to build the ML model/learning model for each UID of the application. In an example herein, the built ML table/learning model may be the ML regression model as illustrated in FIG. 8A. The MEC processor 310 may use the ML regression model to predict the edge processing time for the initiated application requests.

In an embodiment, the MEC processor 310 may upload the built ML regression model to the at least one edge server 204 as illustrated in FIG. 8B. The MEC processor 310 may upload the ML regression model using the REST APIs for the edge processing capabilities with unique key as the application signatures.

In an embodiment, the MEC processor 310 may request the training data/regression model (e.g., the ML table/learning model) from the at least one edge sever 204 on connecting the edge server 204 for the first time. In response to request from the MEC processor 310, the edge server 204 derives the mean of crowd-sourced data from the ML regression models uploaded by the different UEs. The edge server 204 communicates the mean of the crowd-sourced data from the ML regression models as the training data to the MEC processor 310 as illustrated in FIG. 8B. Thus, the MEC processor 310 may need not to build the ML table/learning model independently.

In an embodiment, the MEC processor 310 may build the ML table/learning model based on the edge processing capabilities received from the edge server 204. As illustrated in FIG. 8C, for receiving the edge processing capabilities, the MEC processor 310 performs the handshake with the at least one edge server 204 for authentication of the UE 208 (1). The edge server 204 performs the authentication of the UE 208 and informs the MEC processor 310 about the successful authentication (2).

Once the authentication is successful, the MEC processor 310 requests the at least one edge server 204 for the processing capabilities (3). In response to the request for the processing capabilities, the edge server 204 communicates the mean of the crowd-sourced data/values with respect to the at least one application which has initiated the task requests (4). The mean of crowd-sourced data may be used as the initial training set. Thereafter, the edge server 204 also communicates the processing capabilities of the edge server 204 to the MEC processor 310 (5). The MEC processor 310 can use the mean of crowd-sourced data and the edge processing capabilities to build the ML table/learning model.

Figure 9:
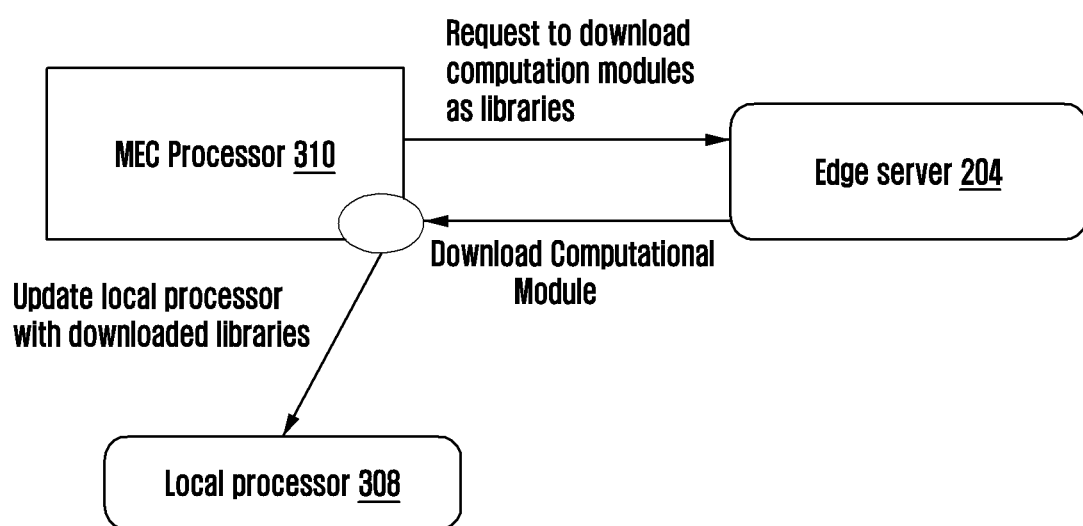
FIG. 9 is an example diagram illustrating downloading of computational libraries from an edge server for local processing of the application requests, according to embodiments as disclosed herein.

FIG. 9 is an example diagram illustrating downloading of the computational libraries from the edge server for local processing of the application requests, according to embodiments as disclosed herein. Embodiments herein enable the MEC processor 310 to download the computational modules for processing the application requests on the UE 108 locally. In an embodiment, the MEC processor 310 may trigger the downloading of the computational modules based on movement of the UE 208 from MEC enabled areas (availability of the edge server 204 to the UE 208) to non-MEC enabled areas (unavailability of the edge server 204 to the UE 208). In an embodiment, the MEC processor 310 may trigger the downloading of the computational modules from the edge server 204 on deciding the local processing for processing the application requests.

The MEC processor 310 transmits the request to the edge server 204 for downloading the computational modules as libraries for processing the requests of the specific application. In response to the request for the computational modules, the edge server 204 enables the MEC processor 310 to download the computational modules, which can be used as the plug-n-play services for processing the requests of the specific application.

Figure 10:
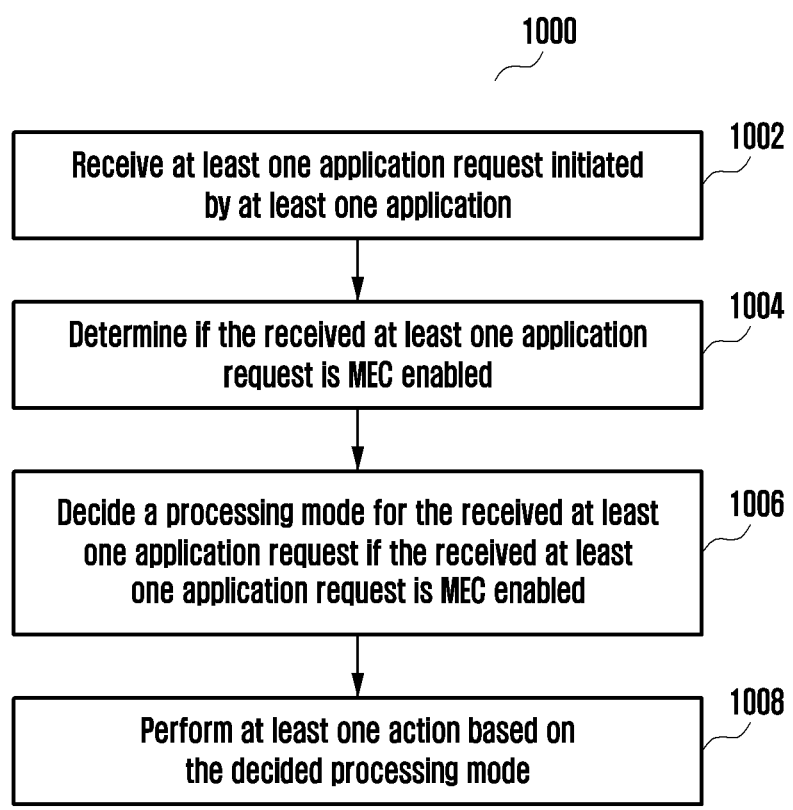
FIG. 10 is a flow diagram illustrating a method for optimizing processing of application requests, according to embodiments as disclosed herein.

FIG. 10 is a flow diagram 1000 illustrating a method for optimizing processing of application requests, according to embodiments as disclosed herein.

At operation 1002, the method includes receiving, by the UE 208, the at least one application request initiated by the at least one application.

At operation 1004, the method includes determining, by the UE 108, if the received at least one application request is MEC enabled.

At operation 1006, the method includes deciding, by the UE 208, a processing mode for the received at least one application request if the received at least one application request is MEC enabled. The processing mode can be decided using at least one of the MEC computing, and the local computing. The processing mode can be at least one of the local processing, the edge processing and the hybrid processing.

At operation 1008, the method includes performing, by the UE 208, at least one action based on the processing mode decided for the received at least one application request. The at least one action includes at least one of processing the initiated at least one application request locally by the UE 208, offloading the initiated at least one application request to the edge server 204 by the UE 208 for processing, processing the initiated at least one request in combination with the local processing and the edge processing.

Embodiments herein provide a processing mode that can be used for processing application requests. The processing mode can be at least one of a local processing, an edge processing, and a hybrid processing. Embodiments herein enable the applications to utilize at least one of the local processing, the edge processing, and the hybrid processing to process or compute their task requests using a set of unique Application Program Interfaces (APIs) associated with the applications.

Embodiments herein provide a unique rule-based (machine learning (ML)) module within a User Equipment, that may provide a training model for prediction of edge processing time. Embodiments herein derive a cost function for the applications that have initiated the task requests. The cost function can be derived based on at least one of local processing time, edge processing time, user preference, and battery level of the UE. Embodiments herein analyze the cost function and the predicted edge processing time to decide the processing mode for processing the application requests.

Embodiments herein enable the UE to obtain edge server processing capabilities using crowd sourcing ML training modules with application signatures as a key value from the edge server. Embodiments herein enable the UE to obtain edge server processing capabilities from an edge computation platform hosted on a server infrastructure.

Embodiments herein provide ML based trigger that enables the UE to download computational modules as plug-n-play computational libraries from the edge server for processing the application requests.

Embodiments herein enable the edge server to host common computational modules, which can be on-demand downloaded by application server instances running on the edge infrastructure.

The embodiments disclosed herein can be implemented through at least one software program running on at least one hardware device and performing network management functions to control the elements. The elements shown in FIGS. 2Aa, 2Bb, 3 and 4 can be at least one of a hardware device, or a combination of hardware device and software module.

The embodiments disclosed herein describe methods and systems for optimizing processing of application requests. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in, e.g., Very high speed integrated circuit Hardware Description Language (VHDL) another programming language, or implemented by one or more VHDL or several software modules being executed on at least one hardware device. The hardware device can be any kind of portable device that can be programmed. The device may also include means which may be hardware means, e.g., an ASIC, or a combination of hardware and software means, e.g. an ASIC and an FPGA, or at least one microprocessor and at least one memory with located therein. The method embodiments described herein may be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A method for optimizing processing of application requests, the method comprising:
    receiving, by a user equipment (UE), at least one application request initiated by at least one application;
    identifying, by the UE, whether the received at least one application request is multi-access edge computing (MEC) enabled;
    deciding, by the UE, a processing mode for the received at least one application request based on the received at least one application request being MEC enabled, wherein the processing mode is decided using at least one of the MEC and local computing; and
    performing, by the UE, at least one action based on the processing mode decided for the received at least one application request.

2. The method of claim 1, wherein the processing mode includes at least one of a local processing, an edge processing, and a hybrid processing.

3. The method of claim 1, wherein the deciding of the processing mode comprises:
    determining at least one parameter by accessing a device state system for the received at least one application request, wherein the at least one parameter includes at least one of signal strength of a radio access network (RAN) supported by the UE, type of the RAN, network congestion state associated with the RAN, a unique identifier (UID) of the at least one application associated with the received at least one application request;
    determining at least one of local processing time and edge processing time for the received at least one application request by passing the received at least one application request and the determined at least one parameter as a key value to at least one machine learning (ML) table;
    deriving a cost function for the received at least one application request; and
    generating a processing decision parameter based on analysis of the cost function and the determined at least one of local processing time and edge processing time for the received at least one application request,
    wherein the processing decision parameter indicates the processing mode for the received at least one application request.

4. The method of claim 3, further comprising building, by the UE, the at least one ML table by fetching training data from at least one of a local processing database and an edge processing database,
    wherein the training data fetched from the local processing database includes information about previously determined local processing time with respect to a plurality of application requests, and the training data fetched from the edge processing database includes information about previously determined edge processing time with respect to the plurality of application requests and at least one of the signal strength of the RAN supported by the UE, the type of the RAN, the network congestion state associated with the RAN.

5. The method of claim 3, further comprising building, by the UE, the at least one ML table by receiving edge processing capabilities from at least one edge server.

6. The method of claim 5, wherein the receiving of the edge processing capabilities comprises at least one of:
    receiving the edge processing capabilities through a mean of crowd-sourced data from the at least one edge server, wherein the mean of crowd-sourced data is derived by the at least one edge server from a plurality of ML tables uploaded to the at least one edge server by a plurality of user equipments (UEs); and
    receiving the edge processing capabilities along with the mean of crowd-sourced data from the at least one edge server by performing a handshake with the at least one edge server.

7. The method of claim 3, wherein the determining of at least one of the local processing time and the edge processing time for the received at least one application request comprises:
    comparing the received at least one application request and the determined at least one parameter for the received at least one application request with data of the ML table, wherein the data of the ML table includes a plurality of application requests of a plurality of applications mapped with a plurality of parameters, edge processing time, and local processing time;
    identifying at least one application request and corresponding at least one parameter of the ML table matching with the received at least one application request and the determined at least one parameter for the received at least one application request; and
    determining at least one of the local processing time and the edge processing time mapped with the identified at least one application request and corresponding at least one parameter of the ML table as at least one of the local processing time and the edge processing time for the received at least one application request.

8. The method of claim 3, wherein the deriving of the cost function comprises:
    assigning at least one weight to at least one of the determined local processing time for the received at least one application request, the determined edge processing time for the received at least one application request, battery level of the UE, and at least one user preference; and
    deriving the cost function as a function of the assigned at least one weight to at least one of the determined local processing time, the determined edge processing time, the battery level of the UE, and the at least one user preference.

9. The method of claim 3, wherein the generating of the processing decision parameter comprises:
    performing an analysis on the derived cost function and the determined edge processing time for the received at least one application request, wherein the performing of the analysis on the derived cost function comprises performing comparisons among at least one of the determined local processing time, the determined edge processing time, battery level of the UE, and at least one user preference based on associated at least one weight; and
    generating the processing decision parameter based on the performed analysis.

10. The method of claim 1, wherein the performing of the at least one action comprises at least one of:
- processing the received at least one application request locally based on the decided processing mode being the local processing;
- offloading the received at least one application request to at least one edge server based on the decided processing mode being the edge processing; and
- processing the received at least one application request using a combination of the local processing and the edge processing based on the decided processing mode being hybrid processing.

11. The method of claim 1, further comprising downloading, by the UE, at least one computational module as library from at least one edge server for processing the at least one application request locally.

12. A user equipment (UE) comprising:
- a memory; and
- a controller coupled to the memory and configured to:
  - receive at least one application request initiated by at least one application;
  - identify whether the received at least one application request is MEC enabled;
  - decide a processing mode for the received at least one application request based on the received at least one application request being MEC enabled, wherein the processing mode is decided using at least one of MEC and local computing; and
  - perform at least one action based on the processing mode decided for the received at least one application request.

13. The user equipment of claim 12, wherein the processing mode includes at least one of a local processing, an edge processing, and a hybrid processing.

14. The user equipment of claim 12, wherein the controller is further configured to:
- determine at least one parameter on initiating the at least one application request, wherein the at least one parameter includes at least one of signal strength of at least one radio access network (RAN) supported by the UE, type of the at least one RAN, network congestion state associated with the at least one RAN, a unique identifier (UID) of the at least one application associated with the received at least one application request;
- determine at least one of local processing time and edge processing time for the received at least one application request using the determined at least one parameter and at least one machine learning (ML) table;
- derive a cost function for the received at least one application request; and
- generate a processing decision parameter based on analysis of the cost function and the determined at least one of local processing time and edge processing time for the received at least one application request, wherein the processing decision parameter indicates the processing mode for the received at least one application request.

15. The user equipment of claim 14, wherein the controller is further configured to build the at least on ML table by fetching training data from at least one of a local processing database and an edge processing database,
- wherein the training data fetched from the local processing database includes information about previously determined local processing time with respect to a plurality of application requests, and the training data fetched from the edge processing database includes information about previously determined edge processing time with respect to the plurality of application requests and at least one of the signal strength of the RAN supported by the UE, the type of the RAN, the network congestion state associated with the RAN.

16. The user equipment of claim 14, wherein the controller is further configured to build the at least one ML table by receiving edge processing capabilities from at least one edge server.

17. The user equipment of claim 14, wherein the controller is further configured to:
- compare the received at least one application request and the determined at least one parameter for the received at least one application request with data of the ML table, wherein the data of the ML table includes a plurality of application requests of a plurality of applications mapped with a plurality of parameters, edge processing time, and local processing time;
- identify at least one application request and corresponding at least one parameter of the ML table matching with the received at least one application request and the determined at least one parameter for the received at least one application request; and
- determine at least one of the local processing time and the edge processing time mapped with the identified at least one application request and corresponding at least one parameter of the ML table as at least one of the local processing time and the edge processing time for the received at least one application request.

18. The user equipment of claim 14, wherein the controller is further configured to:
- assign at least one weight to at least one of the determined local processing time for the received at least one application request, the determined edge processing time for the received at least one application request, battery level of the UE, and at least one user preference; and
- derive the cost function as a function of the assigned at least one weight to at least one of the determined local processing time, the determined edge processing time, the battery level of the UE, and the at least one user preference.

19. The user equipment of claim 14, wherein the controller is further configured to:
- perform an analysis on the derived cost function and the determined edge processing time for the received at least one application request, wherein the performing of the analysis on the derived cost function comprises performing comparisons among at least one of the determined local processing time, the determined edge processing time, battery level of the UE, and at least one user preference based on associated at least one weight; and
- generate the processing decision parameter based on the performed analysis.

20. The user equipment of claim 12, wherein the controller is further configured to:
- process the received at least one application request locally based on the decided processing mode being the local processing;
- offload the received at least one application request to at least one edge server based on the decided processing mode being the edge processing; and
- process the received at least one application request using a combination of the local processing and the edge processing based on the decided processing mode being the hybrid processing.

* * * * *